(12) United States Patent
Miyagawa et al.

(10) Patent No.: US 8,561,578 B2
(45) Date of Patent: Oct. 22, 2013

(54) HYDROGEN GENERATOR AND INTERNAL COMBUSTION ENGINE PROVIDED WITH HYDROGEN GENERATOR

(75) Inventors: Hiroshi Miyagawa, Aichi-gun (JP); Makoto Koike, Toyota (JP); Susumu Kojima, Susono (JP); Tomojiro Sugimoto, Susono (JP); Rioh Shimizu, Mishima (JP); Norihiko Nakamura, Mishima (JP)

(73) Assignees: Kabushiki Kaisha Toyota Chuo Kenkyusho, Aichi (JP); Toyota Jidosha Kabushiki Kaisha, Toyota (JP)

( * ) Notice: Subject to any disclaimer, the term of this patent is extended or adjusted under 35 U.S.C. 154(b) by 348 days.

(21) Appl. No.: 12/981,932

(22) Filed: Dec. 30, 2010

(65) Prior Publication Data
US 2012/0167840 A1 Jul. 5, 2012

(51) Int. Cl.
*F02B 43/08* (2006.01)
*G05D 7/00* (2006.01)

(52) U.S. Cl.
USPC ............................................. 123/3; 422/111

(58) Field of Classification Search
USPC ............................................. 123/3; 422/111
See application file for complete search history.

(56) References Cited

U.S. PATENT DOCUMENTS

| | | | |
|---|---|---|---|
| 3,973,524 A * | 8/1976 | Rubin | 123/3 |
| 4,416,224 A * | 11/1983 | Hobby et al. | 123/3 |
| 4,480,595 A * | 11/1984 | Hobby et al. | 123/1 A |
| 6,350,394 B1 * | 2/2002 | Ennis et al. | 252/373 |
| 7,338,650 B2 * | 3/2008 | y Escobar et al. | 423/658.2 |
| 8,025,033 B2 * | 9/2011 | Schiltz et al. | 123/1 A |
| 2006/0204799 A1 * | 9/2006 | Ishikawa et al. | 429/19 |
| 2007/0084651 A1 * | 4/2007 | Dong | 180/65.2 |
| 2011/0283959 A1 * | 11/2011 | Aso et al. | 123/3 |
| 2011/0283960 A1 * | 11/2011 | Hikazudani et al. | 123/3 |
| 2012/0015802 A1 | 1/2012 | Okamura et al. | |
| 2012/0040261 A1 | 2/2012 | Nakanishi et al. | |

FOREIGN PATENT DOCUMENTS

| | | |
|---|---|---|
| JP | A-5-332152 | 12/1993 |
| JP | A-2010-241647 | 10/2010 |
| JP | 2010269239 A * | 12/2010 |
| JP | A-2010-269239 | 12/2010 |
| WO | WO 2010/107065 A1 | 9/2010 |

* cited by examiner

*Primary Examiner* — Lindsay Low
*Assistant Examiner* — Charles Brauch
(74) *Attorney, Agent, or Firm* — Oliff & Berridge, PLC

(57) ABSTRACT

A hydrogen generator provided with a cracker which cracks a compound containing hydrogen atoms and nitrogen atoms to generate hydrogen, a compound feeder which feeds the compound to the cracker, and an oxygen feeder which feeds oxygen to the cracker. The cracker includes catalyst particles which promote the cracking of the compound and catalyst particles which promote the oxidation of the compound. The cracker is fed with the compound and oxygen, causes the compound to oxidize to generate heat of oxidation, and uses the generated heat of oxidation to crack the compound.

19 Claims, 14 Drawing Sheets

HYDROGEN GENERATOR AND INTERNAL COMBUSTION ENGINE PROVIDED WITH HYDROGEN GENERATOR

BACKGROUND OF THE INVENTION

1. Field of the Invention

The present invention relates to a hydrogen generator and to an internal combustion engine provided with a hydrogen generator.

2. Description of the Related Art

In a fuel cell or an engine etc. using hydrogen as fuel, it is necessary to feed hydrogen to the system. As the apparatus for feeding hydrogen, in addition to an apparatus reforming natural gas etc., an apparatus storing hydrogen in a tank, etc., an apparatus generating hydrogen using ammonia as a material is known. In such an apparatus, it is possible to store ammonia in a tank and raise the ammonia to a high temperature for cracking to generate hydrogen.

Japanese Patent Publication (A) No. 5-332152 discloses an ammonia combustion engine, able to burn ammonia gas to obtain a drive force, provided with an ammonia cracking reactor which uses the exhaust gas of the combustion chambers to crack the ammonia. The exhaust gas from the combustion chamber is used to heat a heat exchange pipe in the ammonia cracking reactor. It is disclosed that the ammonia gas led into the heat exchange pipe is cracked into hydrogen and nitrogen by an endothermic reaction absorbing the heat of the exhaust gas.

In a hydrogen generator raising ammonia to a high temperature to crack it and generate hydrogen, it is possible to arrange a cracking catalyst including catalyst particles for promoting cracking of the ammonia. By arranging the cracking catalyst, the cracking of the ammonia can be promoted, for example, it is possible to lower the temperature for cracking the ammonia.

The cracking reaction of ammonia is an endothermic reaction, so to enable the cracking catalyst to continue to crack the ammonia, the cracking catalyst has to be supplied with heat. In the ammonia combustion engine disclosed in Japanese Patent Publication (A) No. 5-332152, the heat of the exhaust gas discharged from the combustion chambers is utilized to crack the ammonia gas into hydrogen and nitrogen. In this regard, in a system which obtains the heat required for cracking ammonia from the exhaust gas, if the temperature of the exhaust gas is low, it may not be possible to supply sufficient heat to the cracking catalyst and therefore hydrogen may not be suitably generated.

For example, at the time of cold start of an internal combustion engine etc., raising the temperature of the exhaust gas ends up taking time, so suitable generation of hydrogen by the hydrogen generator may also take time. In the ammonia combustion engine disclosed in this publication, an auxiliary heater is arranged for heating the heat exchange pipe for cracking the ammonia. When the temperature of the exhaust gas is low, the auxiliary heater is used to heat the heat exchange pipe. However, if using an auxiliary heater to heat a cracking catalyst to a temperature where the cracking reaction of ammonia occurs or if using an auxiliary heater to supply heat for continuing the cracking of ammonia, a large electric power will be required. There is therefore the problem that a large electric power source will be required for feeding power to the auxiliary heater.

Further, in this ammonia combustion engine, a hydrogen storage device is arranged. However, there is the problem that if arranging a hydrogen storage device in the hydrogen generator, the hydrogen generator will become larger in size or will become more complicated. Furthermore, there is the problem that when the hydrogen stored in the hydrogen storage device ends up being consumed, hydrogen will no longer be able to be supplied.

SUMMARY OF THE INVENTION

An object of the present invention is to provide a hydrogen generator superior in performance in supplying heat for cracking a material to a catalyst and to provide an internal combustion engine provided with such a hydrogen generator.

The hydrogen generator of the present invention is provided with a cracker which cracks a compound containing hydrogen atoms and nitrogen atoms to generate hydrogen, a compound feeder which feeds the compound to the cracker, and an oxygen feeder which feeds oxygen to the cracker. The cracker includes a catalyst having catalyst particles for promoting cracking of the compound and catalyst particles for promoting oxidation of the compound. The generator feeds the cracker with the compound and oxygen, causes the compound to oxidize to generate heat of oxidation, and uses the generated heat of oxidation to crack the compound.

In the above invention, preferably the cracker comprises a first cracker, the hydrogen generator is further provided with a second cracker including a catalyst having catalyst particles which promote cracking of the compound, the catalyst of the first cracker and the catalyst of the second cracker are formed so as to exchange heat with each other, and the compound feeder is formed so as to be able to feed the compound to the first cracker and the second cracker and adjust the flow of the compound fed to the first cracker and the flow of the compound fed to the second cracker.

In the above invention, preferably the hydrogen generator is provided with a catalyst temperature detector which detects a temperature of the catalyst of the second cracker and, when the temperature of the catalyst of the second cracker is less than a predetermined temperature, reduces the flow of the compound fed to the second cracker and increases the flow of the compound fed to the first cracker.

In the above invention, preferably the oxygen feeder feeds oxygen to the cracker so that a molar ratio of oxygen to the compound which the compound feeder feeds becomes 0 to 0.3.

In the above invention, preferably the hydrogen generator is provided with a catalyst temperature detector which detects the temperature of the catalyst and a controller which controls at least one of the compound feeder and oxygen feeder, the compound feeder is formed so as to be able to adjust the flow of the compound fed to the cracker, the oxygen feeder is formed to be able to adjust the flow of oxygen fed to the cracker, and the controller adjusts at least one of the flow of the compound and the flow of oxygen fed to the catalyst so that the temperature of the catalyst detected by the catalyst temperature detector becomes within a predetermined range of temperature.

In the above invention, preferably the controller uses the catalyst temperature detector to detect the temperature of the catalyst and, when the detected temperature of the catalyst is higher than a predetermined temperature, reduces the flow ratio of the oxygen to the compound.

In the above invention, preferably the controller uses the catalyst temperature detector to detect the temperature of the catalyst and, when the detected temperature of the catalyst is lower than a predetermined temperature, increases the flow ratio of the oxygen to the compound.

In the above invention, preferably the hydrogen generator is provided with a mixer arranged in a flow path at an upstream side from the catalyst, and the mixer is formed to promote mixing of gas containing oxygen fed from the oxygen feeder and gas containing the compound fed from the compound feeder.

The internal combustion engine of the present invention is provided with the above hydrogen generator, an engine body including a combustion chamber in which fuel is burned and an engine intake passage connected to the combustion chamber, and a hydrogen feeder connected to the hydrogen generator. The oxygen feeder feeds the air inside the engine intake passage to the cracker. The hydrogen feeder feeds the hydrogen produced in the hydrogen generator as fuel to the combustion chamber.

In the above invention, preferably the compound feeder includes a tank which stores the liquid compound and an evaporator which heats the liquid compound to vaporize it, and at least part of the gaseous compound produced at the evaporator is fed as fuel to the combustion chamber without passing through the cracker.

In the above invention, preferably the engine body is formed so as to be cooled by cooling water, the hydrogen generator includes a cooler arranged at a downstream side of the cracker and cooling the gas flowing out from the cracker, and the cooler is formed so as to cool the gas flowing out from the cracker by the cooling water of the engine body.

In the above invention, preferably the engine is further provided with a speed detection device which detects the engine speed of the internal combustion engine, the hydrogen feeder is formed so as to be able to adjust the amount of hydrogen fed to the combustion chamber, and the engine detects the engine speed and increases the amount of hydrogen fed to the combustion chamber the higher the engine speed.

In the above invention, preferably the hydrogen generator is provided with a controller which controls at least one of the compound feeder and oxygen feeder, the compound feeder is formed so as to be able to adjust the flow of the compound fed to the cracker, the oxygen feeder is formed to be able to adjust the flow of oxygen fed to the cracker, and the controller adjusts at least one of the flow of oxygen and the flow of compound fed to the cracker based on the amount of hydrogen fed by the hydrogen feeder to the combustion chamber.

In the above invention, preferably the engine is provided with a load detection device which detects a load of the internal combustion engine, the hydrogen feeder is formed so as to be able to adjust the amount of hydrogen fed to the combustion chamber, and the engine detects the load of the internal combustion engine and increases the amount of hydrogen fed to the combustion chamber the smaller the load of the internal combustion engine.

In the above invention, preferably the hydrogen generator is provided with a controller which controls at least one of the compound feeder and oxygen feeder, the compound feeder is formed so as to be able to adjust the flow of the compound fed to the cracker, the oxygen feeder is formed to be able to adjust the flow of oxygen fed to the cracker, and the controller adjusts at least one of the flow of oxygen and the flow of the compound fed to the cracker based on the amount of hydrogen fed by the hydrogen feeder to the combustion chamber.

In the above invention, preferably the hydrogen generator is provided with a heater that heats the catalyst, and, when starting up the internal combustion engine, the engine uses the heater to heat the catalyst and, when the temperature of the catalyst becomes higher than a predetermined temperature, starts the feeds of oxygen and the compound to the catalyst.

In the above invention, preferably the compound feeder is formed so as to be able to adjust the flow of the compound fed to the cracker, the oxygen feeder is formed to be able to adjust the flow of oxygen fed to the cracker, and when the temperature of the catalyst is lower than a predetermined temperature, the engine increases the flow ratio of the oxygen to the compound.

In the above invention, preferably the engine is provided with an engine temperature detector which detects the temperature of the engine body, the compound feeder is formed so as to be able to adjust the flow of the compound fed to the cracker, the oxygen feeder is formed to be able to adjust the flow of oxygen fed to the cracker, and the hydrogen generator, when the temperature of the engine body is lower than a predetermined temperature, feeds the compound and oxygen to the cracker so that a molar ratio of oxygen to the compound becomes 0.15 or more.

In the above invention, preferably the engine is provided with an operating state detection device which detects an operating state of the internal combustion engine, the compound feeder is formed so as to be able to adjust the flow of the compound fed to the cracker, and the hydrogen generator changes the flow ratio of the compound fed from the evaporator to the cracker to the compound fed from the evaporator to the combustion chamber without going through the cracker based on the operating state of the internal combustion engine.

In the above invention, preferably the operating state detection device is provided with an engine temperature detector which detects the temperature of the engine body, and the engine detects the temperature of the engine body and increases the flow ratio of the compound fed to the cracker to the compound fed to the combustion chamber without going through the cracker the lower the temperature of the engine body.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Embodiment 1

Referring to FIG. 1 to FIG. 7, a hydrogen generator of Embodiment 1 will be explained. The hydrogen generator in the present embodiment uses a compound containing nitrogen atoms and hydrogen atoms as a material. In the present embodiment, liquid ammonia is used as a material. The hydrogen generator supplies heat to the liquid ammonia to vaporize it and thereby generate gaseous ammonia. Furthermore, the gaseous ammonia is raised in temperature and cracked on the cracking catalyst to generate hydrogen.

Figure 1:
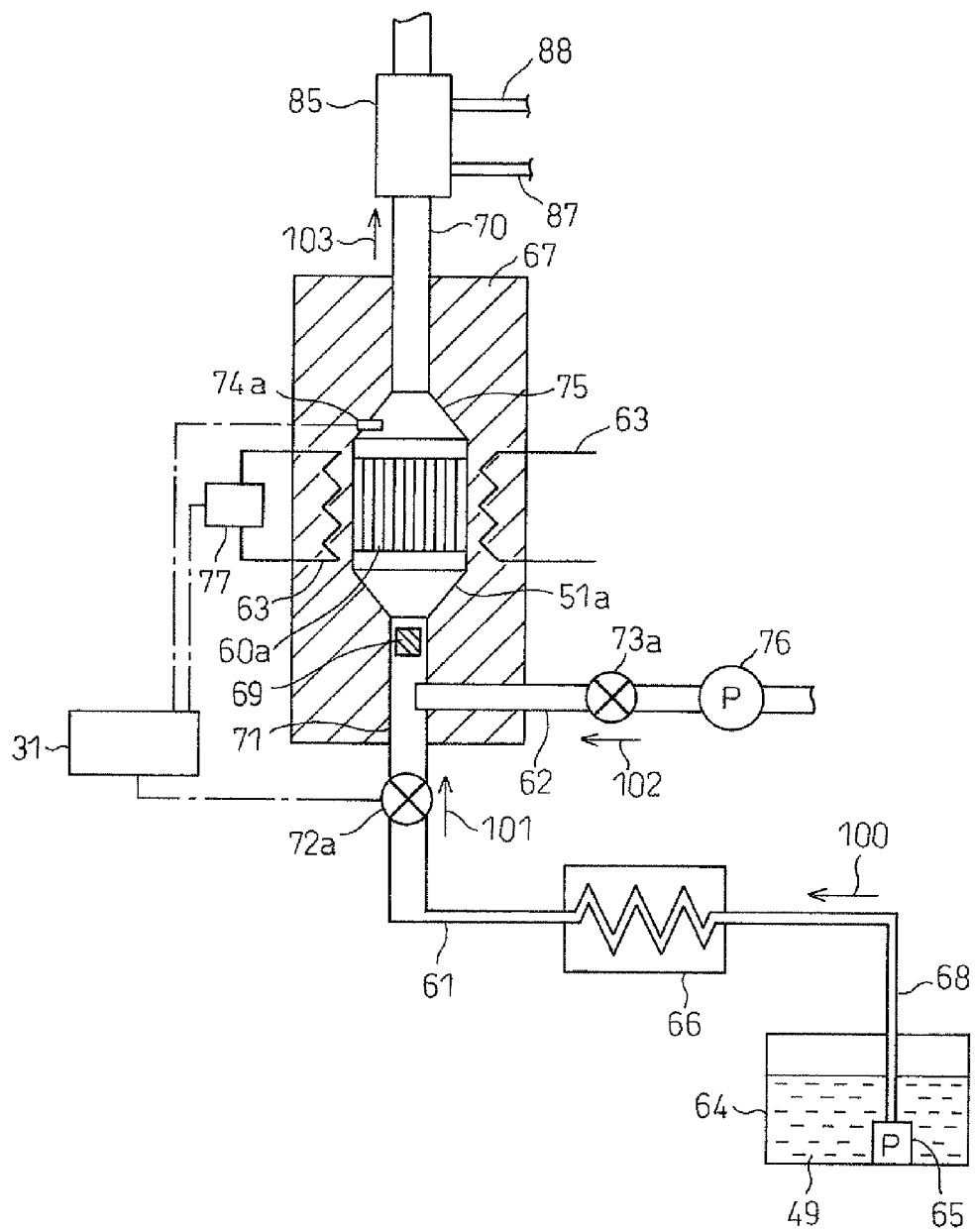
FIG. 1 is a schematic view of a hydrogen generator in Embodiment 1.

FIG. 1 is a schematic view of the hydrogen generator in the present embodiment. The hydrogen generator in the present embodiment is provided with a cracker 51a for cracking the ammonia. The cracker 51a in the present embodiment includes a cracking catalyst 60a. The catalyst 60a includes catalyst particles for promoting cracking of the ammonia and catalyst particles for promoting the oxidation of ammonia. The catalyst 60a in the present embodiment functions as a cracking catalyst which cracks the ammonia and, furthermore, functions as an oxidation catalyst which oxidizes the ammonia. That is, the cracker 51a in the present embodiment includes a cracking catalyst and oxidation catalyst. Specifically, the cracker 51a includes catalyst 60a which is comprised of the cracking catalyst and oxidation catalyst combined together.

The catalyst 60a in the present embodiment is formed as a honeycomb structure. The catalyst 60a in the present embodiment has a plurality of flow paths formed along the direction of flow of the fluid. That is, the catalyst 60a includes a substrate in which a plurality of flow paths are formed. The substrate is, for example, formed by cordierite or a metal. On the surfaces of the flow paths of the substrate, coated layers are formed. At the coated layers, particle-like carriers carrying catalyst particles are arranged.

In the present embodiment, the catalyst particles for oxidizing the ammonia and the catalyst particles for cracking the ammonia are carried on carriers. The carriers are for example formed by aluminum oxide. As the metal of the catalyst particles for oxidizing the ammonia, platinum or other precious metals or iron or other base metals may be mentioned. The catalyst particles for oxidizing the ammonia are not limited to this mode and can be formed from any metal promoting oxidation of ammonia.

As the metal of the catalyst particles for cracking the ammonia, platinum, rhodium, ruthenium, or another precious metal or nickel, cobalt or another base metal may be illustrated. In the present embodiment, rhodium and ruthenium are employed. The catalyst particles for cracking the ammonia are not limited to this mode and can be formed by any metal promoting the cracking of ammonia.

The cracker 51a includes a container 75. The catalyst 60a is arranged inside the container 75. The container 75, for example, can be formed by stainless steel. The container 75 is connected to an inflow pipe 71 into which the air and the ammonia of the material flow. Further, the container 75 is connected to an outflow pipe 70 out of which gas containing the generated hydrogen flows.

The hydrogen generator in the present embodiment is provided with a compound feeder for feeding ammonia as a material to the cracker 51a. The compound feeder includes a tank 64 for storing ammonia. The tank 64 is pressurized inside it and stores liquid ammonia 49. The compound feeder in the present embodiment includes a pump 65 for feeding the liquid ammonia 49. The pump 65 is connected to the liquid ammonia feed pipe 68.

The compound feeder includes an evaporator 66 connected to the liquid ammonia feed pipe 68. The evaporator 66 is formed so as to be able to heat the liquid ammonia. The evaporator 66 can vaporize the liquid ammonia. The evaporator 66 in the present embodiment has an electric heater attached to it and is formed so that heat is supplied from the outside. The outlet of the evaporator 66 is connected to an ammonia feed pipe 61 feeding the gaseous ammonia. The ammonia feed pipe 61 is connected to the inflow pipe 71.

The hydrogen generator in the present embodiment is provided with an oxygen feeder which feeds oxygen to the cracker 51a. The oxygen feeder in the present embodiment feeds air to the cracker 51a as gas containing oxygen. The oxygen feeder in the present embodiment includes an air pump 76. The air pump 76 in the present embodiment feeds outside air to the cracker 51a. The oxygen feeder includes an air feed pipe 62 connected to the air pump 76. The air feed pipe 62 is connected to an inflow pipe 71 so as to feed air to the inflow pipe 71. The oxygen feeder in the present embodiment is formed to feed air to the cracker, but the invention is not limited to this mode. The oxygen feeder may also be formed to be able to feed gas containing oxygen to the cracker.

Inside the inflow pipe 71, a mixer 69 for mixing the gases flowing into the catalyst 60a is arranged. The mixer 69 is formed to sufficiently mix the gaseous ammonia and the air. In the present embodiment, a swirl type mixer is arranged. The mixer 69 is arranged downstream from the position where the air feed pipe 62 is connected to the inflow pipe 71.

In the middle of the ammonia feed pipe 61, a flow regulator 72a is arranged for regulating the flow of gaseous ammonia fed to the catalyst 60a. Further, in the middle of the air feed pipe 62, a flow regulator 73a is arranged for regulating the flow of air fed to the catalyst 60a.

The outflow pipe 70 is connected to a cooler 85. The cooler 85 is formed so as to cool the high temperature gas flowing out from the cracker 51a. The cooler 85 has coolant flowing into it through an inflow pipe 87. Coolant heat exchanged at the cooler 85 is exhausted from an outflow pipe 88. The gas flowing out from the hydrogen generator includes hydrogen. When the gas flowing out from the hydrogen generator contacts the gas containing oxygen in the high temperature state, the hydrogen sometimes burns. Alternatively, the devices to which hydrogen is fed from the hydrogen generator are sometimes thermally damaged. For this reason, the hydrogen generator of the present embodiment connects the cooler 85 to the cracker 51a and cools the gas flowing out from the cracker 51a.

The hydrogen generator in the present embodiment is provided with an electronic control unit 31 as a controller. The electronic control unit 31 in the present embodiment includes a digital computer. The respective devices included in the hydrogen generator are controlled by the electronic control unit 31. The pump 65 feeding the ammonia and the air pump 76 are controlled by the electronic control unit 31. Further, flow regulators 72a, 73a are controlled by the electronic control unit 31.

Inside of the container 75 of the cracker 51a, downstream of the catalyst 60a, a temperature sensor 74a is arranged as a catalyst temperature detector for detecting the temperature of the catalyst 60a. The signal of the temperature detected by the temperature sensor 74a is input to the electronic control unit 31. The temperature sensor 74a is not limited to this mode and need only be formed so as to be able to detect the temperature of the catalyst 60a. For example, the temperature sensor 74a may also be arranged inside the catalyst 60a.

The hydrogen generator in the present embodiment is provided with an electric heater 63 as the heater heating the catalyst 60a. The electric heater 63 is formed so as to be able to heat the catalyst 60a. The electric heater 63 is connected to a power source 77. The power source 77 in the present embodiment is controlled by the electronic control unit 31.

Around the cracker 51a, a heat insulating member 67 is arranged. The heat insulating member 67, for example, can be formed by glass wool etc. By arranging the heat insulating member 67 around the cracker 51a, the emission of heat from the cracker 51a can be suppressed. Further, the devices and members arranged around the hydrogen generator can be protected from being damaged by heat.

The heater heating the catalyst 60a in the present embodiment includes an electric heater 63, but the invention is not limited to this mode. The heater need only be formed so as to be able to heat the catalyst 60a. For example, inside the container 75 of the cracker 51a at the upstream side of the catalyst 60a, an electrically heated catalyst (EHC) may be arranged for heating the gas flowing into the catalyst 60a.

The hydrogen generator of the present embodiment raises the temperature of the catalyst 60a by the electric heater 63 at the time of startup. The electric heater 63 in the present embodiment heats the catalyst 60a to the activation temperature or more. For example, the catalyst 60a is heated by the electric heater 63 until the temperature of the catalyst 60a becomes about 200° C. or more.

In the present embodiment, the feed of ammonia is started when the temperature of the catalyst 60a becomes a predetermined temperature or more. For example, when the catalyst 60a becomes the activation temperature or more, the feed of ammonia is started. The electronic control unit 31 drives the heater heating the evaporator 66. The electronic control unit 31 drives the pump 65 and opens the flow regulator 72a. The liquid ammonia 49, as shown by the arrow 100, is fed to the evaporator 66. In the evaporator 66, the liquid ammonia 49 changes to a gas. The now gaseous ammonia runs through the ammonia feed pipe 61 and is fed into the inflow pipe 71 as shown by the arrow 101.

On the other hand, the electronic control unit 31 drives the air pump 76. The electronic control unit 31 opens the flow regulator 73a. As shown by the arrow 102, air flows in through the air feed pipe 62 and is fed to the inflow pipe 71. The air-fuel mixture of the air and the ammonia flows into and is mixed at the mixer 69. By the air-fuel mixture passing through the mixer 69, it is possible to prevent a local imbalance in concentrations of air and ammonia from occurring. Subsequently, the air-fuel mixture of the air and the ammonia flows into the catalyst 60a. In this way the air is supplied to the catalyst 60a in addition to the ammonia in the hydrogen generator of the present embodiment.

The gas flowing into the catalyst 60a includes oxygen, so part of the ammonia fed is oxidized by the oxidation function of the catalyst 60a. The ammonia undergoes an oxidation reaction as shown by the following formula:

$$NH_3 + (3/4)O_2 \rightarrow (1/2)N_2 + (3/2)H_2O \quad (1)$$

The oxidation of ammonia is an exothermic reaction. For this reason, the catalyst 60a is heated. The ammonia which could not be used for the oxidation reaction undergoes a cracking reaction by the cracking function of the catalyst 60a. The ammonia is reformed to nitrogen and hydrogen. The cracking reaction of ammonia becomes as shown in the following formula:

$$NH_3 \rightarrow (1/2)N_2 + (3/2)H_2 \quad (2)$$

The cracking reaction of ammonia occurs at a predetermined temperature or more. Further, the cracking reaction of ammonia is an endothermic reaction. The hydrogen generator of the present embodiment can oxidize part of the ammonia in the catalyst 60a and use the heat of oxidation to crack the ammonia. The cracked gas flowing out from the catalyst 60a includes steam in addition to hydrogen and nitrogen. The produced cracked gas flows out from the outflow pipe 70 as shown by the arrow 103. The high temperature gas flowing out from the cracker 51a is cooled by the cooler 85.

The compound feeder in the present embodiment can adjust the opening degree of the flow regulator 72a so as to adjust the flow of ammonia fed to the catalyst 60a. The oxygen feeder in the present embodiment can adjust the opening degree of the flow regulator 73a so as to adjust the flow of air fed to the catalyst 60a, that is, the flow of oxygen. In this way, the hydrogen generator in the present embodiment is provided with a flow ratio regulator which regulates the ratio of the flow of air (flow of oxygen) to the flow of ammonia fed to the catalyst 60a. The flow ratio regulator can regulate the flow ratio (molar ratio) of oxygen to the ammonia in the gas fed to the catalyst 60a.

Figure 2:
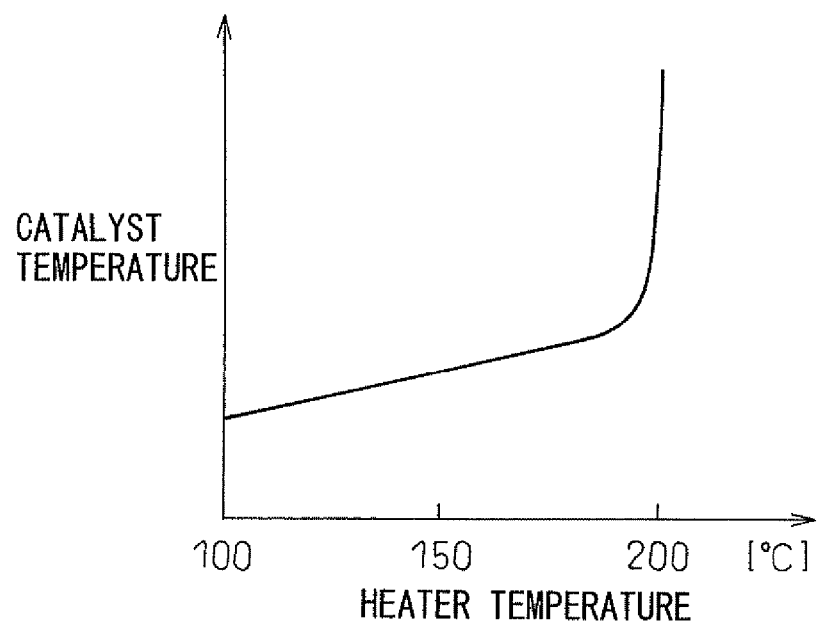
FIG. 2 is a graph showing the relationship between the temperature of the electric heater and the temperature of the catalyst in the hydrogen generator in Embodiment 1.

FIG. 2 is a graph showing the relationship between the temperature of the electric heater which heats the catalyst and the temperature of the catalyst in the hydrogen generator of the present embodiment. FIG. 2 is a graph of the case when generating hydrogen while fixing the molar ratio of the oxygen to the ammonia in the gas fed to the cracker 51a. If gradually raising the temperature of the electric heater, when the temperature of the electric heater is about 200° C., the temperature of the catalyst rapidly rises. That is, when the temperature of the electric heater is about 200° C., the catalyst particles which promote the oxidation reaction contained in the catalyst 60a are activated. It will be understood that by oxidation of the ammonia, heat of oxidation is generated.

Figure 3:
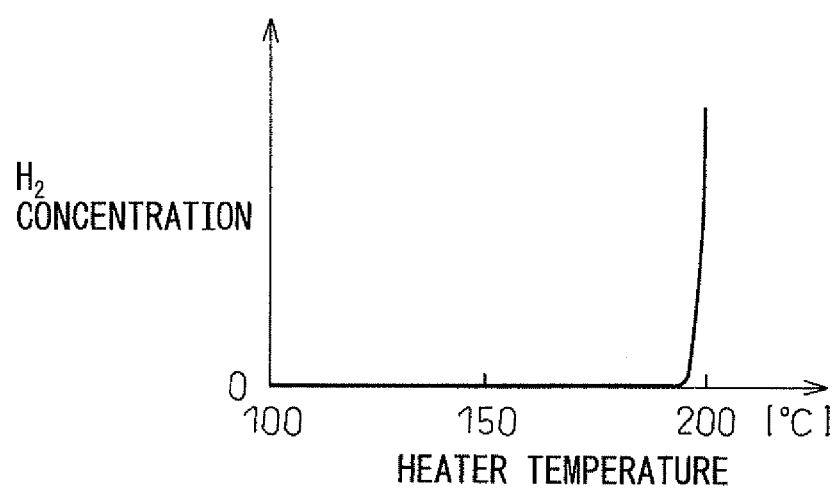
FIG. 3 is a graph between the temperature of the electric heater and the hydrogen concentration contained in the gas flowing out from the cracker in the hydrogen generator in Embodiment 1.

FIG. 3 is a graph for explaining the relationship between the temperature of the electric heater which heats the catalyst and the hydrogen concentration of the gas flowing out from the cracker in the hydrogen generator of the present embodiment. FIG. 3, like FIG. 2, is a graph of the case when generating hydrogen while fixing the molar ratio of the oxygen to the ammonia in the gas fed to the cracker 51a. It will be understood that when the temperature of the electric heater is less than about 200° C., hydrogen is not generated. It will be understood that when the temperature of the electric heater becomes about 200° C., hydrogen is generated. Referring to FIG. 2 and FIG. 3, it will be understood that when the temperature of the catalyst becomes about 200° C., the oxidation reaction causes the temperature of the catalyst 60a to rapidly rise and, furthermore, the ammonia is cracked.

Note that, in the tests of FIG. 2 and FIG. 3, the tests were also run for the case of making the flow of air fed to the cracker zero, but even if the temperature of the electric heater rises to 200° C., no generation of hydrogen could be observed. In this way, the hydrogen generator in the present embodiment promotes a cracking reaction at the time of startup etc., so it is possible to lower the temperature for heating the catalyst using the heater.

Figure 4:
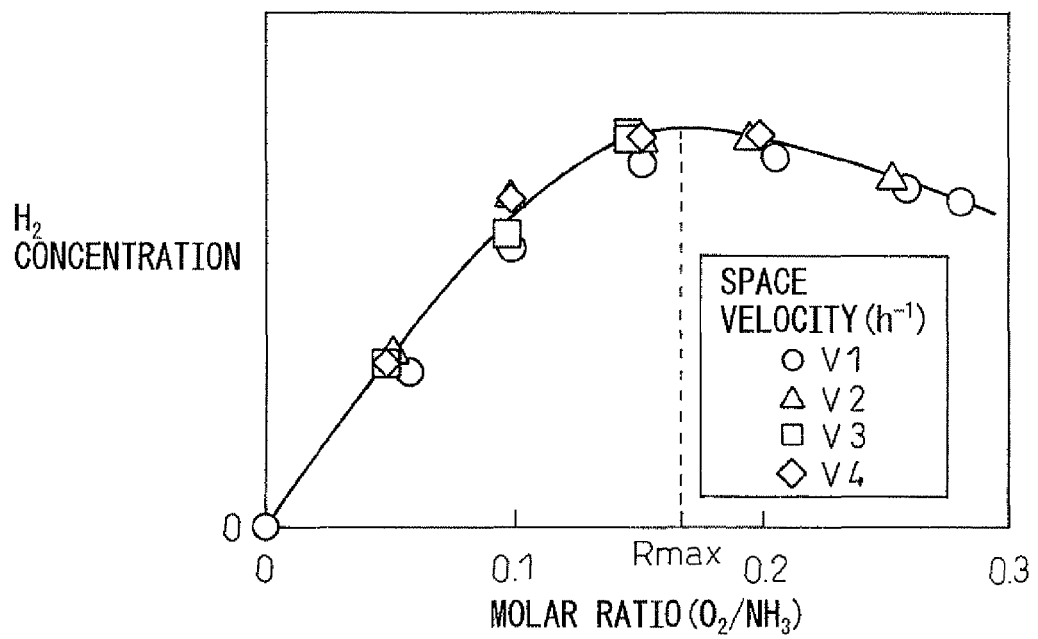
FIG. 4 is a graph showing the relationship between the molar ratio of gas flowing into the cracker and the hydrogen concentration contained in the gas flowing out from the cracker in the hydrogen generator in Embodiment 1.

FIG. 4 is a graph explaining the relationship between the molar ratio of the oxygen to the ammonia in the gas fed to the cracker and the concentration of hydrogen in the gas flowing out from the cracker in the present embodiment. In this test, the test is run several times while changing the space velocity from the velocity V1 to the velocity V4. It will be understood that if gradually making the molar ratio of the oxygen to the ammonia rise from near zero, the concentration of hydrogen in the gas produced will rise. At the molar ratio Rmax, the hydrogen concentration becomes maximum. In the region larger than the molar ratio Rmax, the larger the molar ratio, the smaller the hydrogen concentration.

Figure 5:
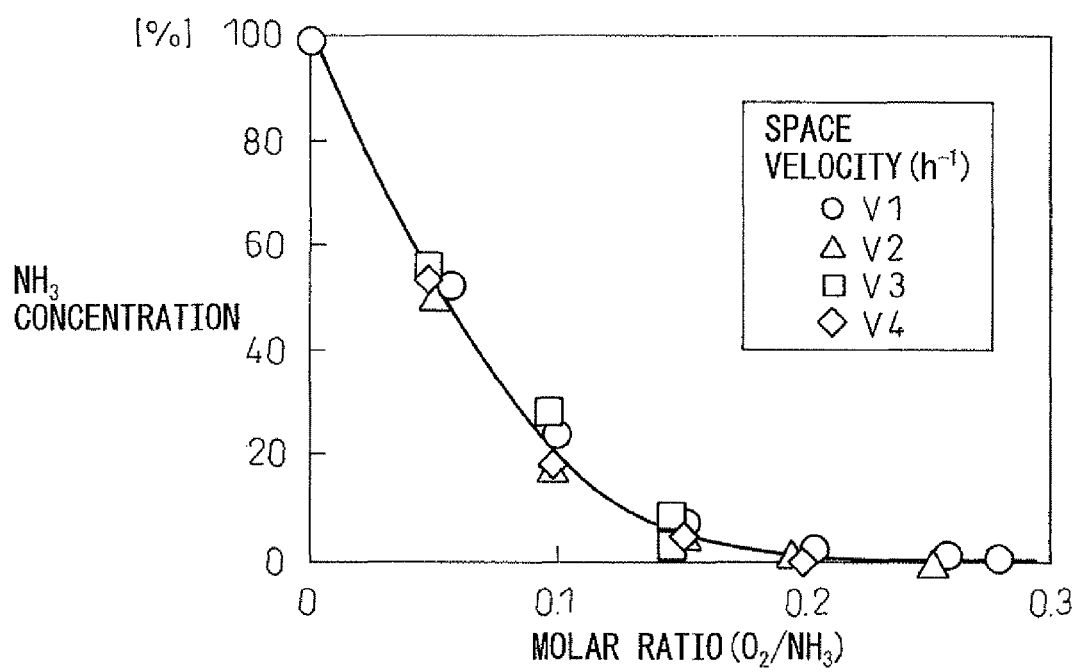
FIG. 5 is a graph showing the relationship between the molar ratio of gas flowing into the cracker and the ammonia concentration contained in the gas flowing out from the cracker in the hydrogen generator in Embodiment 1.

FIG. 5 is a graph for explaining the relationship between the molar ratio of the oxygen to the ammonia in the gas fed to the cracker of the present embodiment and the ammonia concentration of the gas flowing out from the cracker. The ordinate shows the concentration of ammonia flowing out without being cracked at the cracker. It will be understood that if raising the molar ratio of the oxygen to the ammonia, the concentration of ammonia flowing out from the cracker will be reduced. It will be understood that when the molar ratio of the oxygen to the ammonia is about 0.2, the concentration of ammonia in the gas flowing out from the cracker becomes zero. That is, it will be understood that the ammonia fed to the cracker is substantially completely consumed.

Referring to FIG. 4 and FIG. 5, in the region where the molar ratio of the oxygen to the ammonia is small, the amount of heat is insufficient for cracking the ammonia. If raising the molar ratio of the oxygen to the ammonia, the temperature of the catalyst rises. For this reason, the hydrogen concentration of the gas flowing out from the cracker rises and the ammonia concentration of the gas flowing out from the cracker falls.

In this regard, if the molar ratio of the oxygen to the ammonia exceeds about 0.2, all of the fed ammonia is consumed. Furthermore, the generated hydrogen is consumed by the oxidation reaction. For this reason, if raising the molar ratio of the oxygen to the ammonia, the hydrogen concentration of the gas produced is reduced. In this way, by changing the molar ratio of the oxygen to the ammonia fed to the cracker, it is possible to adjust the hydrogen concentration and ammonia concentration contained in the gas flowing out from the hydrogen generator.

Further, from the graphs of FIG. 4 and FIG. 5, it will be learned that even if changing the space velocity of the gas flowing into the catalyst, the hydrogen concentration and ammonia concentration of the generated gas are substantially the same. The hydrogen generator in the present embodiment can generate hydrogen by a large concentration compared with the hydrogen generators of the related art even if raising the space velocity. For this reason, it is possible to reduce the size of the cracker from the hydrogen generators of the related art. Alternatively, it is possible to reduce the amount of catalyst metal used for producing the catalyst.

Figure 6:
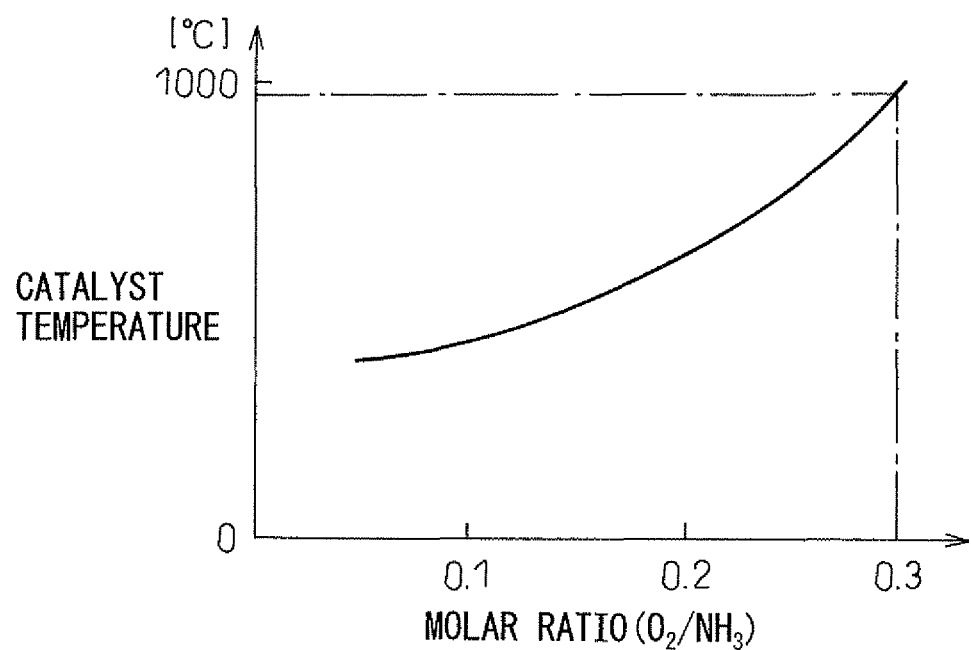
FIG. 6 is a graph showing the relationship between the molar ratio of gas flowing into the cracker of the hydrogen generator and the temperature of the catalyst in the hydrogen generator in Embodiment 1.

FIG. 6 is a graph of the temperature of the catalyst when changing the molar ratio of the oxygen to the ammonia in the gas fed to the cracker in the hydrogen generator of the present embodiment. It will be understood that if increasing the molar ratio of the oxygen to the ammonia, that is, if increasing the content of oxygen, the temperature of the catalyst 60a rises. For example, if increasing the ratio of the air contained in the gas flowing into the catalyst 60a, the oxidation reaction occurs more and the temperature of the catalyst 60a rises. In this way, it is learned that by changing the molar ratio of the oxygen to the ammonia, it is possible to adjust the temperature of the catalyst.

In this regard, when the temperature of the catalyst becomes a high temperature, sometimes the catalyst deteriorates. For example, when the temperature of the catalyst becomes a high temperature, sometimes sintering, the phenomenon where the catalyst particles aggregate, occurs. Alternatively, when the substrate carrying the catalyst particles is formed by a metal, sometimes the substrate is thermally damaged. For this reason, the temperature of the catalyst is preferably, for example, about 1000° C. or less.

Referring to FIG. 6, the temperature of the catalyst when the molar ratio of the oxygen to the ammonia is about 0.3 is less than 1000° C. For this reason, the hydrogen generator is preferably controlled so that the molar ratio of the oxygen to the ammonia becomes about 0 to about 0.3.

The hydrogen generator in the present embodiment can adjust the molar ratio of the oxygen to the ammonia to generate heat of oxidation and use the heat of oxidation of the ammonia to crack the ammonia. Referring to FIG. 1, at the time of startup of the hydrogen generator etc., the electric heater 63 is powered up to heat the catalyst 60a. After the catalyst 60a is raised to a temperature where a predetermined activity can be obtained, the power to the electric heater 63 is stopped. In this way, the hydrogen generator in the present embodiment can crack the ammonia without supplying heat from the outside to the catalyst 60a during the operating period when cracking ammonia.

Figure 7:
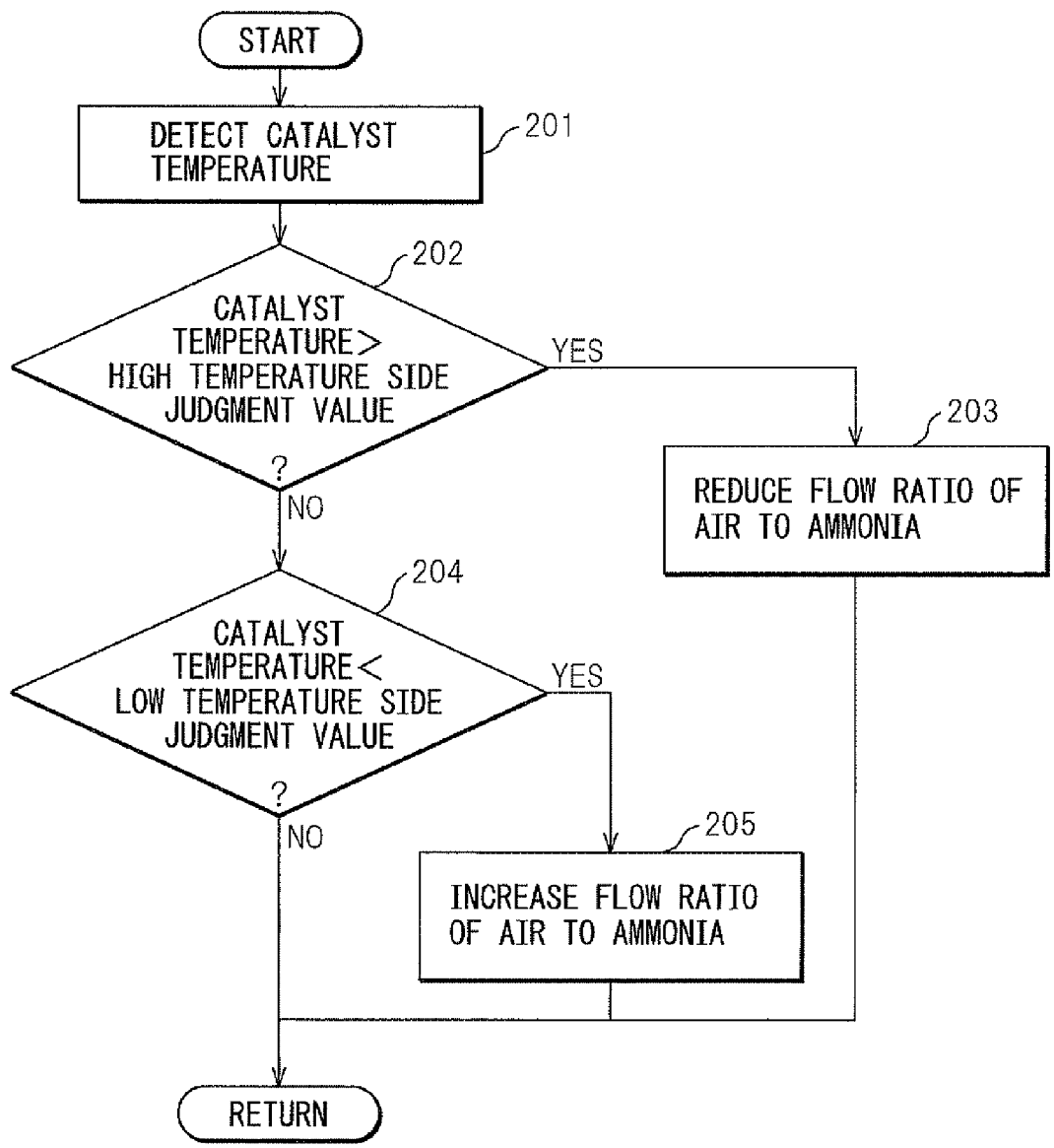
FIG. 7 is a flowchart of operational control in the hydrogen generator in Embodiment 1.

FIG. 7 is a flowchart for explaining the operational control of the hydrogen generator in the present embodiment. The operational control shown in FIG. 7 can be performed repeatedly at, for example, predetermined time intervals. The hydrogen generator in the present embodiment detects the temperature of the catalyst of the cracker and adjusts the molar ratio of the oxygen to the ammonia in the gas fed to the catalyst so that the temperature of the catalyst becomes within a predetermined temperature range. In the present embodiment, the flow of ammonia and the flow of air are adjusted.

Referring to FIG. 1 and FIG. 7, at step 201, the temperature of the catalyst 60a is detected. The temperature of the catalyst 60a can be detected by a temperature sensor 74a arranged downstream of the catalyst 60a.

At step 202, it is judged if the temperature of the catalyst 60a is greater than a predetermined high temperature side temperature judgment value. That is, it is judged if a predetermined temperature range is deviated from. As the high temperature side temperature judgment value of the catalyst 60a, for example, the temperature at which deterioration of the catalyst 60a remarkably progresses may be employed. When, at step 202, the temperature of the catalyst 60a is higher than the predetermined high temperature side temperature judgment value, the routine proceeds to step 203.

At step 203, control is performed to reduce the flow ratio of air to ammonia. In the present embodiment, the flow ratio of air to ammonia is reduced without changing the space velocity of the gas fed to the catalyst. Referring to FIG. 1, in the present embodiment, control is performed to reduce the opening degree of the flow regulator 73a which regulates the flow of air on the one hand and to increase the opening degree of the flow regulator 72a which regulates the flow of ammonia. Referring to FIG. 6, by performing this control, the molar ratio of the oxygen to the ammonia is reduced and the temperature of the catalyst 60a can be lowered. If, at step 203, the temperature of the catalyst 60a falls to a predetermined temperature, this control is ended. Alternatively, this control may also be ended if changing to a predetermined flow ratio.

When, at step 202, the temperature of the catalyst 60a is a predetermined high temperature side temperature judgment value or less, the routine proceeds to step 204. At step 204, it is judged if the temperature of the catalyst 60a is less than a predetermined low temperature side temperature judgment value. That is, it is judged if the temperature of the catalyst 60a is outside of a predetermined temperature range. As the low temperature side temperature judgment value of the catalyst 60a, for example, the activation temperature of the catalyst 60a may be employed.

When, at step 204, the temperature of the catalyst 60a is less than the predetermined low temperature side temperature judgment value, the routine proceeds to step 205. At step 205, control is performed to increase the flow ratio of air to ammonia. In the present embodiment, the flow ratio of the air to the ammonia is increased without changing the spatial flow of the gas in the catalyst. Referring to FIG. 1, in the present embodiment, control is performed to increase the opening degree of the flow regulator 73a which regulates the flow of air on the one hand and to reduce the opening degree of the flow regulator 72a which regulates the flow of ammonia. Referring to FIG. 6, by performing this control, the molar ratio of the oxygen to the ammonia increases and the temperature of the catalyst 60a can be raised. At step 205, after the temperature of the catalyst 60a rises to a predetermined temperature, this control is ended. Alternatively, it is also possible to end this control after changing to a predetermined flow ratio.

In the present embodiment, the flow ratio of air to the ammonia is changed without changing the total flow of the gas fed to the catalyst 60a, but the invention is not limited to this mode. It is also possible to change the total flow of the gas fed to the catalyst 60a. For example, when the catalyst temperature exceeds the high temperature side temperature judgment value, the flow of air may be made zero without changing the flow of ammonia fed to the catalyst.

In the operational control of the present embodiment, the high temperature side temperature judgment value of the catalyst temperature is judged, then the low temperature side temperature judgment value is judged, but the invention is not limited to this mode. It is also possible to judge the low temperature side temperature judgment value, then judge the high temperature side temperature judgment value. Alternatively, it is possible to simultaneously judge the high temperature side temperature judgment value and the low temperature side temperature judgment value. Furthermore, both the high temperature side temperature judgment value and the low temperature side temperature judgment value of the catalyst temperature are judged, but the invention is not limited to this mode. It is also possible to employ either one of the same.

In this regard, the hydrogen generator in the present embodiment can control the molar ratio of the oxygen to the ammonia fed to the catalyst 60a to the desired value by control using the temperature of the catalyst 60a. Referring to FIG. 6, the temperature of the catalyst 60a corresponds to the molar ratio of the oxygen to the ammonia fed to the catalyst 60a. For this reason, by detecting the temperature of the catalyst 60a, it is possible to estimate the molar ratio of the oxygen with respect to the ammonia fed to the catalyst 60a. That is, it is possible to estimate the flow ratio of the air to the ammonia fed to the catalyst 60a.

For example, when raising the molar ratio of the oxygen to the ammonia fed to the catalyst 60a, it is possible to perform control so that the temperature of the catalyst 60a becomes higher. It is possible to control the flow of air and the flow of ammonia so that the molar ratio of the oxygen to the ammonia becomes a target value corresponding to the temperature of the catalyst. In this way, in the hydrogen generator in the present embodiment, instead of the target value of the molar ratio of the oxygen to the ammonia, it is possible to employ the target value of the temperature of the catalyst.

As the compound containing the hydrogen atoms and nitrogen atoms in the present embodiment, that is, the material for generating the hydrogen, ammonia was explained as an example, but the invention is not limited to this mode. For the material, it is possible to employ any compound including hydrogen atoms and nitrogen atoms and breaking down to generate hydrogen. For example, the material may include hydrazine ($N_2H_4$).

The compound feeder in the present embodiment is formed so as to feed a liquid material, but the invention is not limited to this mode. It may also be formed to feed a gas material.

Further, the catalyst for cracking and oxidizing the gas forming the material is not limited to a honeycomb structure. Any structure of catalyst can be employed. For example, the catalyst may also include pellet catalysts having small spherical carriers carrying catalyst particles. Further, in the present embodiment, a catalyst comprised of the cracking catalyst and the oxidation catalyst formed integrally is employed, but the invention is not limited to this mode. The catalyst having the catalyst particles which promote cracking of the compound and the catalyst particles which promote oxidation of the compound may also be comprised of a separate cracking catalyst and oxidation catalyst. For example, a honeycomb structure oxidation catalyst may also be arranged at the upstream side along the flow direction of the exhaust gas and a honeycomb structure cracking catalyst arranged at the downstream side. In a system provided with a separate oxidation catalyst and cracking catalyst, when detecting the temperature of the catalyst, for example, it is possible to detect the temperature of the cracking catalyst.

Embodiment 2

Figure 8:
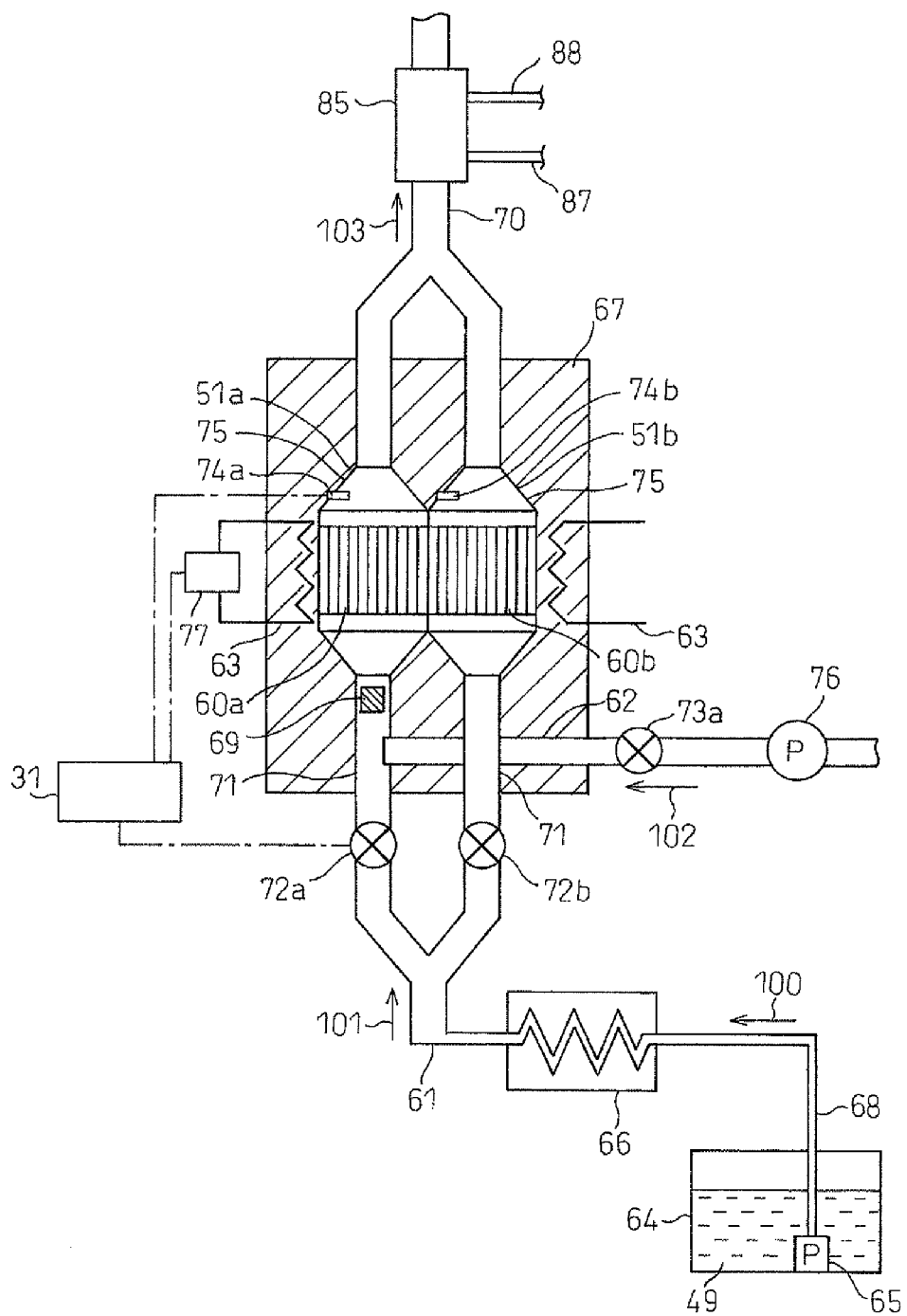
FIG. 8 is a schematic view of a hydrogen generator in Embodiment 2.
Figure 9:
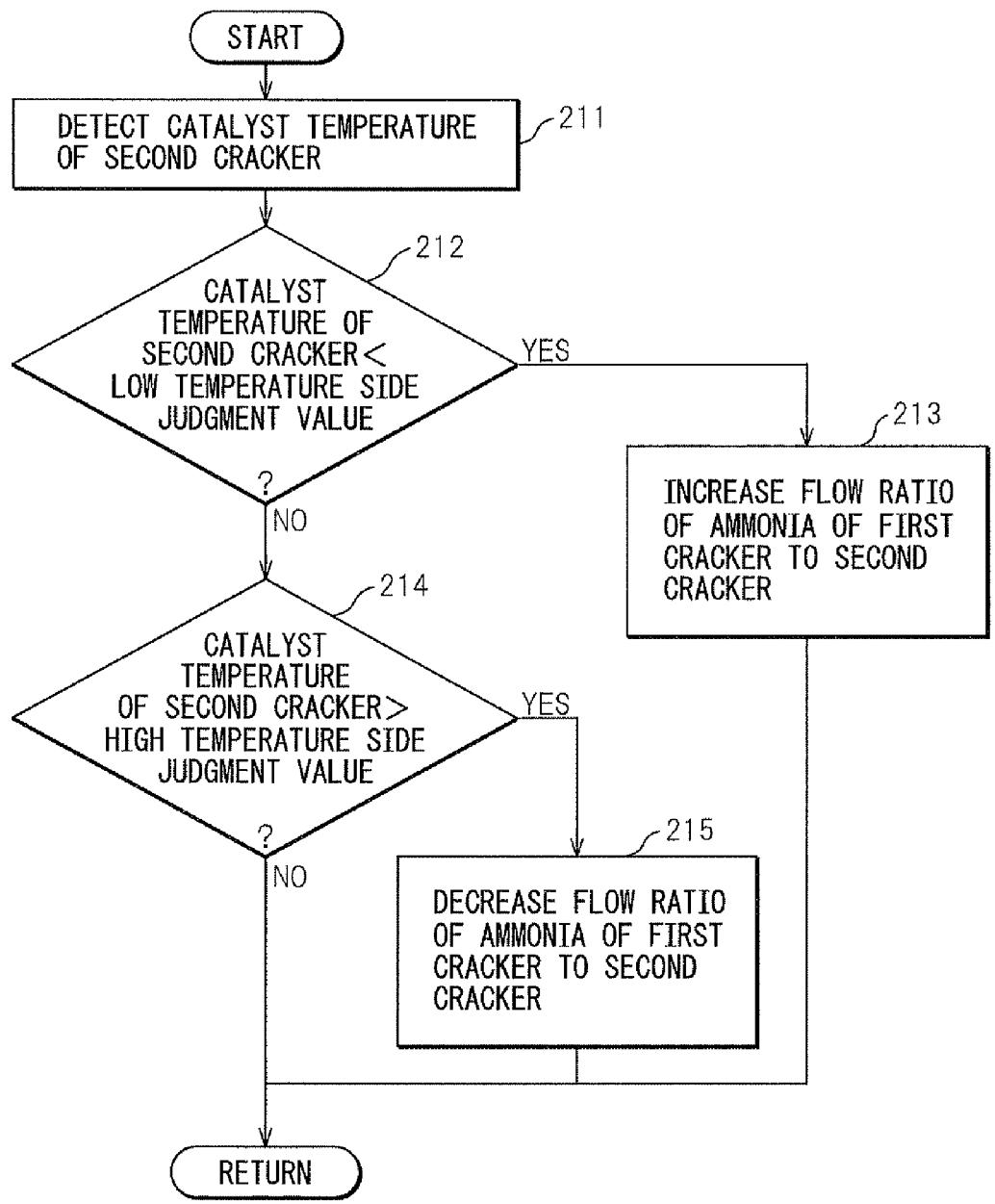
FIG. 9 is a flowchart of operational control of a hydrogen generator in Embodiment 2.

Referring to FIG. 8 and FIG. 9, the hydrogen generator in Embodiment 2 will be explained. The hydrogen generator in the present embodiment is provided with, in addition to the cracker including the catalyst particles which promote oxidation and the catalyst particles which promote oxidation, a cracker including catalyst particles which promote cracking.

FIG. 8 is a schematic view of the hydrogen generator in the present embodiment. The hydrogen generator in the present embodiment is provided with, in addition to the cracker 51a as a first cracker, a cracker 51b as a second cracker. The first cracker is similar to the cracker 51a in Embodiment 1.

The cracker 51b includes a catalyst 60b. The catalyst 60b in the present embodiment is formed in a honeycomb structure. The catalyst 60b in the present embodiment includes catalyst particles which promote cracking. The catalyst 60b in the present embodiment does not carry catalyst particles for promoting oxidation, but the invention is not limited to this mode. Catalyst particles for promoting oxidation may also be carried.

The air feed pipe 62 is connected to an inflow pipe of the cracker 51a. The oxygen feeder in the present embodiment is formed to feed oxygen to the catalyst 60a of the cracker 51a on the one hand and not to feed oxygen to the catalyst 60b of the cracker 51b.

The hydrogen generator in the present embodiment is formed so that the catalyst 60a and the catalyst 60b perform heat exchange. In the present embodiment, the container 75 of the cracker 51a and the container 75 of the cracker 51b are arranged in contact. The configuration by which the catalyst 60a and the catalyst 60b exchange heat is not limited to this mode. For example, between the cracker 51a and the cracker 51b, a heat exchanger may be arranged. As the heat exchanger, one which includes, for example, first fins arranged inside the catalyst 60a and second fins arranged inside the catalyst 60b and has the first fins and second fins connected to each other by heat conductive members may be illustrated.

Inside of the container 75 of the cracker 51b, downstream of the catalyst 60b, a temperature sensor 74b is arranged as the catalyst temperature detector for detecting the temperature of the catalyst 60b. The compound feeder in the present embodiment is formed so as to be able to feed ammonia as the compound to the catalysts 60a, 60b. In the compound feeder, an ammonia feed pipe 61 connected to an evaporator 66 is branched off. The branched off ammonia feed pipe 61 is connected to inflow pipe 71 of the cracker 51a and inflow pipe 71 of cracker 51b. In the middle of the ammonia feed pipe 61 heading toward the cracker 51b, a flow regulator 72b is arranged for regulating the flow of gaseous ammonia fed to the catalyst 60b.

The compound feeder in the present embodiment is formed so as to be able to adjust the opening degrees of the flow regulators 72a, 72b so as to adjust the flow of ammonia fed to the catalysts 60a, 60b. Alternatively, it is formed so as to enable a change of the flow ratio of the ammonia which is fed to the catalyst 60a of the cracker 51a and the ammonia which is fed to the catalyst 60b of the cracker 51b.

The container 75 of the cracker 51b is connected to an outflow pipe 70. The outflow pipe 70 connected to the container 75 of the cracker 51a and the outflow pipe 70 connected to the container 75 of the cracker 51b are merged and connected to the cooler 85.

The hydrogen generator in the present embodiment is provided with an electronic control unit 31. The outputs of the temperature sensors 74a, 74b are input to the electronic control unit 31. Further, the flow regulators 72a, 72b, and 73a are controlled by the electronic control unit 31.

The hydrogen generator of the present embodiment can oxidize the ammonia while cracking ammonia at the cracker 51a serving as the first cracker. Further, it can crack ammonia at the cracker 51b serving as the second cracker. Furthermore, the heat of oxidation generated at the catalyst 60a of the cracker 51a is conducted to the catalyst 60b of the cracker 51b. The hydrogen generator of the present embodiment can also crack ammonia at the catalyst 60b of the cracker 51b utilizing the heat of oxidation generated at the catalyst 60a.

The hydrogen generator in the present embodiment is formed so as to be able to change the flow of ammonia fed to the cracker 51a serving as the first cracker and the flow of ammonia fed to the cracker 51b as the second cracker. Due to this configuration, it is possible to optimize the flow of ammonia fed to the first cracker and the flow of ammonia fed to the second cracker in accordance with the amount of hydrogen required at the hydrogen generator, the temperatures of the catalysts, and other operating conditions. It is therefore possible to suitably generate hydrogen in accordance with the operating conditions.

FIG. 9 is a flowchart of the operational control of the hydrogen generator in the present embodiment. In the operational control of the present embodiment, control is performed so that the temperature of the catalyst 60b of the cracker 51b serving as the second cracker becomes in a predetermined temperature range. The control shown in FIG. 9 may be performed repeatedly at for example predetermined time intervals.

At step 211, the temperature of the catalyst of the second cracker is detected. Referring to FIG. 8, the electronic control unit 31 detects the temperature of the catalyst 60b of the cracker 51b by the temperature sensor 74b.

Next, at step 212, it is determined if the temperature of the catalyst 60b of the cracker 51b is less than a predetermined low temperature side temperature judgment value. As the low temperature side temperature judgment value, for example, the temperature at which the catalyst 60b of the cracker 51b is activated may be employed. When, at step 212, the temperature of the catalyst 60b of the cracker 51b serving as the second cracker is less than the low temperature side temperature judgment value, the routine proceeds to step 213.

At step 213, the flow ratio of ammonia fed to the cracker 51a to the ammonia fed to the cracker 51b is made to increase. In the present embodiment, control is performed to make the flow of ammonia fed to the cracker 51b decrease on the one hand and to make the flow of ammonia to the cracker 51a increase. Referring to FIG. 8, in the present embodiment, control is performed to enlarge the opening degree of the flow regulator 72a communicated with the cracker 51a on the one hand and to reduce the opening degree of the flow regulator 72b communicated with the cracker 51b.

By performing this control, control may be performed to reduce the flow of ammonia fed to the catalyst 60b not accompanied with generation of heat and to increase the flow of ammonia fed to the catalyst 60a accompanied with the generation of heat. The cracker 51a at which oxidation of ammonia occurs can be fed a large amount of ammonia. In the catalyst 60b, the cracking reaction of ammonia becomes smaller, so the temperature of the catalyst 60b can be raised. It is therefore possible to keep the temperature of the catalyst 60b of the cracker 51b from dropping too much and the cracking ability of the ammonia from becoming less than the desired ability. In this case, it is also possible to increase the flow of air fed to the cracker 51a. By increasing the flow of air fed to the cracker 51a, it is possible to suppress a drop in the temperature of the catalyst 60a. Alternatively, it is possible to raise the temperature of the catalyst 60a. As a result, the temperature of the catalyst 60b can be quickly raised.

When, at step 213, for example, the temperature of the catalyst 60b of the second cracker becomes a predetermined temperature or more, the control can be ended. Alternatively, it is also possible to end the control after changing to a predetermined flow ratio. This control is ended after the increase in temperature of the cracker 51b at step 213 ends.

When, at step 212, the temperature of the catalyst 60b of the cracker 51b is the low temperature side temperature judgment value or more, the routine proceeds to step 214.

At step 214, it is determined if the temperature of the catalyst 60b of the cracker 51b is larger than a predetermined high temperature side temperature judgment value. As the high temperature side temperature judgment value, for example, the temperature of the catalyst 60b when the temperature of the catalyst 60a generating the heat of oxidation becomes a temperature at which deterioration occurs can be employed. When, at step 214, the temperature of the catalyst 60b of the cracker 51b is the predetermined high temperature side temperature judgment value or less, this control is ended. When the temperature of the catalyst 60b of the cracker 51b is larger than the predetermined high temperature side temperature judgment value, the routine proceeds to step 215.

At step 215, control is performed to reduce the flow ratio of ammonia fed to the cracker 51a to the ammonia fed to the cracker 51b. In the present embodiment, control is performed to increase the flow of ammonia fed to the cracker 51b on the one hand and to decrease the flow of ammonia fed to the cracker 51*a*. Referring to FIG. 8, in the present embodiment, control is performed to reduce the opening degree of the flow regulator 72*a* communicated with the cracker 51*a* on the one hand and to increase the opening degree of the flow regulator 72*b* communicated with the cracker 51*b*.

By performing this control, it is possible to reduce the temperature of the catalyst 60*a*. In this case, it is also possible to reduce the flow of air fed to the cracker 51*a*. By reducing the flow of air fed to the cracker 51*a*, it is possible to quickly make the temperature of the catalyst 60*a* drop. The flow of ammonia fed to the catalyst 60*a* where a cracking reaction, but not oxidation reaction of the ammonia occurs becomes greater, so the temperature of the catalyst 60*b* can be lowered. The temperature of the catalyst 60*a* of the cracker 51*a* can therefore be kept from rising too much and the catalyst 60*a* from deteriorating.

When, at step 215, for example, the temperature of the catalyst 60*b* of the second cracker becomes a predetermined temperature or less, the control may be ended. Alternatively, the control may be ended after changing to a predetermined flow ratio.

In this way, in the control of the hydrogen generator of the present embodiment, it is possible to use the temperature of the catalyst as the basis to adjust the flow of ammonia fed to the catalyst at which the oxidation reaction occurs and the catalyst at which the oxidation reaction does not occur.

In the operational control of the present embodiment, the temperature of the catalyst of the second cracker is detected, but the invention is not limited to this mode. It is also possible to detect the temperature of the catalyst of the first cracker. Further, in the present embodiment, the low temperature side temperature judgment value is judged, then the high temperature side temperature judgment value is judged, but the invention is not limited to this mode. Either can be performed first. Alternatively, the judgment of the low temperature side temperature judgment value and the judgment of the high temperature side temperature judgment value can be performed simultaneously. Alternatively, control may be performed employing either one of the low temperature side temperature judgment value or high temperature side temperature judgment value.

The rest of the configuration, action, and effects are similar to Embodiment 1, so the explanation will not be repeated here.

Embodiment 3

Referring to FIG. 10 to FIG. 16, an internal combustion engine provided with a hydrogen generator of Embodiment 3 will be explained. In the present embodiment, an internal combustion engine arranged in a vehicle will be explained as an example.

Figure 10:
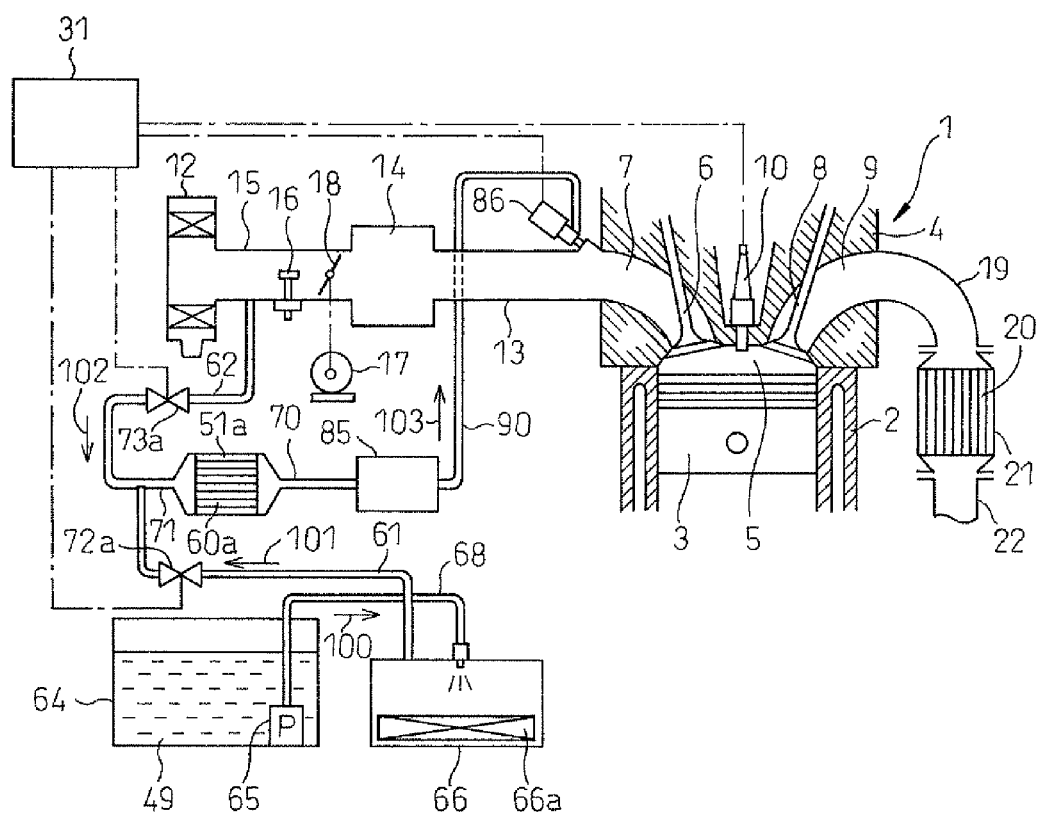
FIG. 10 is a schematic view of a first internal combustion engine of Embodiment 3.

FIG. 10 is a schematic view of the internal combustion engine in the present embodiment. The internal combustion engine in the present embodiment is a spark ignition type. The internal combustion engine is provided with an engine body 1. The engine body 1 includes a cylinder block 2 and cylinder head 4. Inside the cylinder block 2, pistons 3 are arranged. The top face of the each piston 3 and the cylinder head 4 form a combustion chamber 5. That is, a combustion chamber 5 is formed for each cylinder.

Each combustion chamber 5 is connected to the engine intake passage and engine exhaust passage. At the cylinder head 4, a corresponding intake port 7 and exhaust port 9 are formed for each chamber. An intake valve 6 is arranged at an end of the intake port 7 and is formed so as to be able to open and close the engine intake passage communicated with the combustion chamber 5. An exhaust valve 8 is arranged at an end of the exhaust port 9 and is formed so as to be able to open and close the engine exhaust passage communicated with the combustion chamber 5. At the cylinder head 4, a spark plug 10 is fastened as an ignition device. The spark plug 10 is formed so as to ignite the fuel in the combustion chamber 5. The spark plug 10 in the present embodiment is a plasma jet spark plug.

The intake port 7 of each cylinder is connected through a corresponding intake runner 13 to a surge tank 14. The surge tank 14 is connected through an intake duct 15 to an air cleaner 12. At the intake duct 15, an air flow meter 16 is arranged for detecting the amount of intake air. Inside the intake duct 15, a throttle valve 18 driven by a step motor 17 is arranged.

The internal combustion engine in the present embodiment is provided with an exhaust purification system for purifying the exhaust gas. The exhaust purification system includes a catalytic converter 21. The exhaust port 9 of each cylinder is connected to an exhaust manifold 19. The exhaust manifold 19 is connected to the catalytic converter 21. The catalytic converter 21 in the present embodiment includes an oxidation catalyst 20. The catalytic converter 21 is connected to an exhaust pipe 22.

The exhaust purification system in the present embodiment includes an oxidation catalyst, but the invention is not limited to this mode. It is also possible to arrange any device purifying exhaust gas. For example, the exhaust purification system may also have a three-way catalyst or a catalyst for purifying $NO_x$ arranged in it.

The internal combustion engine in the present embodiment is provided with a hydrogen generator. The hydrogen generator in the present embodiment is configured similar to the hydrogen generator in Embodiment 1 (see FIG. 1). The hydrogen generator is provided with a cracker 51*a* including a catalyst 60*a*. An inflow pipe 71 of the cracker 51*a* is connected to an air feed pipe 62. The air feed pipe 62 is connected to the engine intake passage upstream of the throttle valve 18. In the internal combustion engine of the present embodiment, the pressure at the downstream side of the throttle valve becomes lower than the pressure at the upstream side, whereby hydrogen etc. is injected from a fuel injector 86. The outflow pipe 70 of the cracker 51*a* is connected to the cooler 85.

Into the cooler 85 in the present embodiment, engine cooling water cooling the engine body 1 flows. The cooler 85 is formed so as to perform heat exchange between the gas flowing out from the cracker 51*a* and the cooling water of the engine body 1. The engine cooling water enables the gas flowing out from the cracker 51*a* to be cooled. Due to this configuration, it is possible to utilize the engine cooling water of the engine body to cool the gas flowing out from the cracker 51*a*.

The evaporator 66 in the present embodiment includes a heating unit 66*a*. The heating unit 66*a* in the present embodiment is formed to use an electric heater for heating. The heating unit 66*a* is not limited to this mode. It need only be formed so as to vaporize the liquid ammonia. For example, the heating unit 66*a* may be used to vaporize the liquid ammonia by heat exchange with the exhaust gas flowing through the exhaust purification system.

The internal combustion engine in the present embodiment uses the hydrogen produced in the hydrogen generator as fuel and is provided with a hydrogen feeder feeding the combustion chambers with hydrogen. The hydrogen feeder in the present embodiment includes the fuel injector 86 which injects hydrogen toward the inside of the engine intake passage. The fuel injector 86 is connected through a feed pipe 90 to the cooler 85. The hydrogen generated at the cracker 51*a*, as shown by the arrow 103, passes through the outflow pipe 70, cooler 85, and feed pipe 90 and is fed to the fuel injector 86. By opening the fuel injector 86, gas containing hydrogen is released into the engine intake passage.

By cooling the gas containing the hydrogen generated at the cracker 51*a* at the cooler 85, when the hydrogen is released into the engine intake passage, it is possible to keep the hydrogen from burning upon contacting the air. Furthermore, it is possible to suppress backfires resulting from the burning hydrogen flowing back in the engine intake passage.

Figure 11:
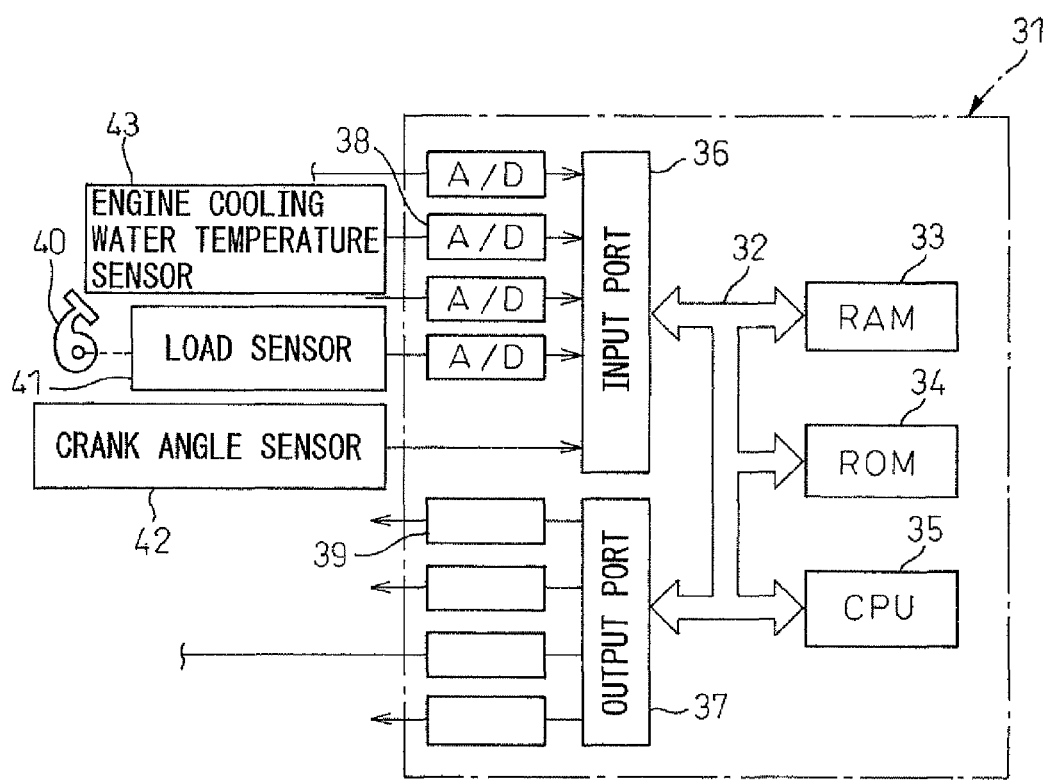
FIG. 11 is a schematic view of an electronic control unit of an internal combustion engine in Embodiment 3.

FIG. 11 is a schematic view of an electronic control unit of the internal combustion engine in the present embodiment. The controller of the internal combustion engine in the present embodiment includes an electronic control unit 31. The electronic control unit 31 in the present embodiment includes a digital computer.

The electronic control unit 31 includes devices connected to each other through a bidirectional bus 32 such as a RAM (random access memory) 33, ROM (read only memory) 34, CPU (microprocessor) 35, input port 36, and output port 37.

Referring to FIG. 10 and FIG. 11, the air flow meter 16 generates an output voltage proportional to the amount of intake air taken into combustion chamber 5. This output voltage is input through the corresponding AD converter 38 to the input port 36. The accelerator pedal 40 is connected to a load sensor 41. The load sensor 41 generates an output voltage proportional to the amount of depression of the accelerator pedal 40. This output voltage is input through the corresponding AD converter 38 to the input port 36. Further, the crank angle sensor 42 generates an output pulse every time the crankshaft, for example, rotates 30°. This output pulse is input to the input port 36. The output of the crank angle sensor 42 may be used to detect the engine speed.

Further, the engine body 1 of the internal combustion engine is cooled by the engine cooling water. The internal combustion engine includes an engine cooling water temperature sensor 43 as an engine temperature detector which detects the temperature of the engine body 1. The engine cooling water temperature sensor 43 is formed so as to detect the temperature of the engine cooling water. The output of the engine cooling water temperature sensor 43 is input through a corresponding AD converter 38 to the input port 36. Furthermore, the electronic control unit 31 receives as input the signals of the temperature sensor etc. included in the hydrogen generator.

The output port 37 of the electronic control unit 31 is connected through corresponding drive circuits 39 to the fuel injector 86 and the spark plugs 10. The electronic control unit 31 in the present embodiment is formed so as to control the fuel injection. Further, the output port 37 is connected to a step motor 17 which drives the throttle valve 18 through the corresponding drive circuits 39. Furthermore, the electronic control unit 31 is connected to the flow regulators, pump, etc. included in the hydrogen generator. The electronic control unit 31 controls the devices included in the hydrogen generator.

The controller of the internal combustion engine is not limited to this mode. It is sufficient that it can control the internal combustion engine. For example, the controller may include an electronic control unit which controls the hydrogen generator and an electronic control unit which controls the engine body and may have these plurality of electronic control units connected to each other by a CAN (Controller Area Network) communication or other communication method.

Referring to FIG. 10, in the internal combustion engine in the present embodiment, the hydrogen generated at the cracker 51*a* of the hydrogen generator and the gaseous ammonia which could not be cracked at the hydrogen generator are injected by the fuel injector 86 to the inside of each intake runner 13. The gas-fuel mixture of the intake air and the hydrogen and ammonia passes through each intake port 7 and is fed to each combustion chamber 5.

In the internal combustion engine in the present embodiment, in each combustion chamber 5, fuel is burned and exhaust gas is generated. The exhaust gas generated in the combustion chamber 5 flows out from the combustion chamber 5 to each exhaust port 9. The exhaust gas flowing out from the exhaust port 9 flows into the catalytic converter 21. In the oxidation catalyst 20 of the catalytic converter 21, the unburned fuel etc. contained in the exhaust gas is oxidized. The exhaust gas purified at the catalytic converter 21 is exhausted through the exhaust pipe 22.

Referring to FIG. 10 and FIG. 11, the internal combustion engine in the present embodiment can burn fuel in each combustion chamber 5 using at least one of ammonia and hydrogen as fuel. The internal combustion engine in the present embodiment is provided with an operating state detection system which detects the operating state of the internal combustion engine. As the operating state of the internal combustion engine, for example, the engine speed or load of the internal combustion engine etc. may be illustrated. The internal combustion engine in the present embodiment detects the operating state of the internal combustion engine and performs control to change the amount of ammonia and the amount of hydrogen fed to each combustion chamber 5 in accordance with the operating state.

The internal combustion engine in the present embodiment is provided with a speed detection system which detects the engine speed. Further, the internal combustion engine in the present embodiment is provided with a load detection system which detects the load of the internal combustion engine. The amount of ammonia and the amount of hydrogen fed to the combustion chamber, for example, can be selected based on the engine speed and load of the internal combustion engine. A map of the feed of the amount of ammonia and a map of the feed of the amount of hydrogen are prepared in advance using the engine speed and load of the internal combustion engine as functions. These maps can be stored in the ROM 34 of the electronic control unit 31.

For example, the output of the crank angle sensor 42 etc. is used to detect the engine speed. Alternatively, the load is detected from the output of a load sensor 41 etc. The detected engine speed or load or other operating state can be used as a basis, together with use of a map stored in the electronic control unit 31, to select the amount of ammonia and the amount of hydrogen fed to the combustion chamber.

In the internal combustion engine of the present embodiment, the amount of air fed to the combustion chamber 5 can be adjusted by controlling the opening degree of the throttle valve 18. The amount of the mixture of the ammonia and hydrogen flowing into combustion chamber 5 can be adjusted by controlling the injection time or injection flows of the fuel injector 86. Furthermore, the hydrogen generator can adjust the amount of hydrogen and the amount of ammonia included in the mixture fed to the fuel injector 86.

By adjusting the air flow and ammonia flow fed to the cracker 51*a* of the hydrogen generator, it is possible to change the ratio of the amount of hydrogen and the amount of ammonia fed to the combustion chamber 5. Referring to FIG. 4 and FIG. 5, in the hydrogen generator of the present embodiment, by changing the flow ratio of air to ammonia fed to the cracker 51a, it is possible to change the hydrogen concentration and ammonia concentration of the gas flowing out from the cracker 51a. For example, in the range of a molar ratio of the oxygen to the ammonia of 0 to Rmax, by increasing the molar ratio of the oxygen to the ammonia, it is possible to raise the hydrogen concentration of the gas flowing out from the cracker 51a on the one hand and to decrease the ammonia concentration.

The total flow of the gas flowing out from the cracker 51a can be adjusted by controlling the air flow and ammonia flow fed to the cracker 51a. For example, the amount of the air-fuel mixture injected from the fuel injector 86 per unit time corresponds to the flow of gas flowing out from the cracker 51a. For this reason, it is possible to use the amount of the air-fuel mixture injected from the fuel injector 86 per unit time as the basis for adjusting the ammonia flow and air flow fed to the cracker 51a.

In this respect, ammonia is slow in combustion speed and poor in ignitability as combustion characteristics. When burning ammonia in the combustion chamber 5, hydrogen functions as a combustion aid promoting the combustion of fuel in the combustion chamber 5. For this reason, when the combustibility of ammonia in the combustion chamber 5 is poor, it is preferable to raise the ratio of hydrogen contained in the fuel. For example, when the engine speed is high or when the load of the internal combustion engine is low, it is preferable to increase the ratio of hydrogen to ammonia in the fuel fed to the combustion chamber.

Figure 12:
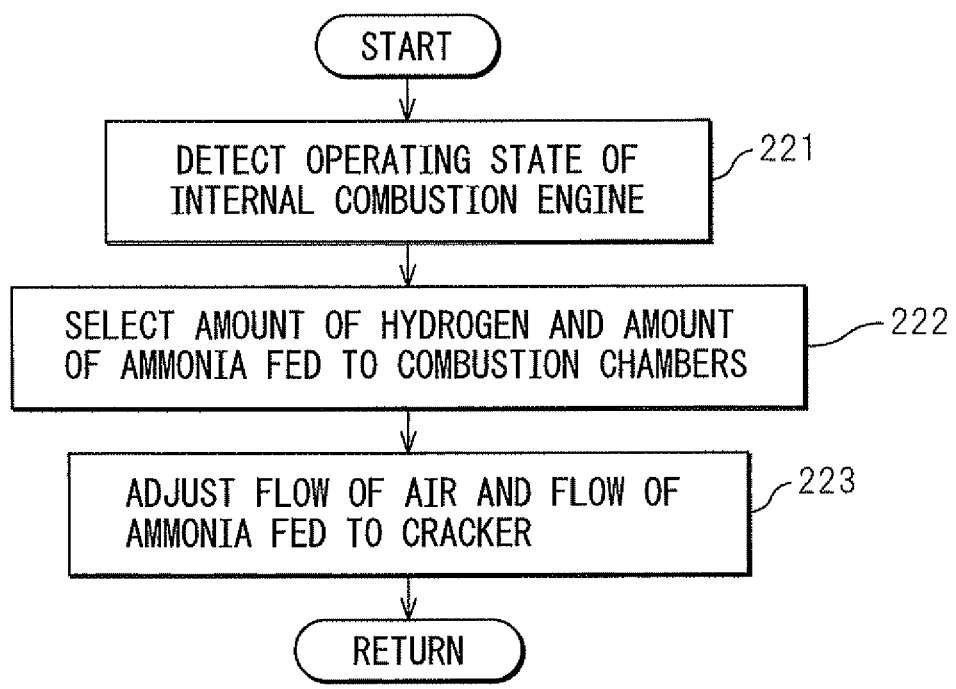
FIG. 12 is a flowchart of operational control of an internal combustion engine in Embodiment 3.

FIG. 12 is a flowchart of the operational control of the internal combustion engine in the present embodiment. At step 221, the operating state of the internal combustion engine is detected. Next, at step 222, the detected operating state of the internal combustion engine is used as the basis to select the amount of hydrogen and the amount of ammonia fed to the combustion chamber. For example, a map stored in advance in the electronic control unit may be used to select the amount of hydrogen and the amount of ammonia.

Next, at step 223, the amount of hydrogen and the amount of ammonia fed to the combustion chamber are used as the basis to control the hydrogen generator. The amount of hydrogen and the amount of ammonia fed to the combustion chamber corresponds to the amount of hydrogen and the amount of ammonia flowing out from the hydrogen generator. The amount of hydrogen and the amount of ammonia fed to the combustion chamber are used as the basis to adjust the ratio of the air flow and ammonia flow fed to the cracker of the hydrogen generator. By performing this control, it is possible to adjust the amount of hydrogen and the amount of ammonia fed to the combustion chamber and possible to generate a suitable amount of hydrogen in the hydrogen generator. In the present embodiment, both the amount of ammonia and the amount of hydrogen fed to the combustion chamber are controlled, but the invention is not limited to this mode. It is also possible to control either one of the same.

When detecting the engine speed as the operating state of the internal combustion engine, it is possible to perform control increasing the amount of the hydrogen fed to the combustion chamber the higher the engine speed. Alternatively, it is possible to perform control to increase the ratio of hydrogen to ammonia in the fuel fed to the combustion chamber the higher the speed of the internal combustion engine. Referring to FIG. 4, in the hydrogen generator, it is possible to perform control to increase the flow ratio of air to ammonia in the gas fed to the cracker the higher the speed of the internal combustion engine. By performing this control, it is possible to stably burn fuel in the combustion chamber even if the speed of the internal combustion engine is high.

When detecting the load of internal combustion engine as the operating state of the internal combustion engine, it is possible to perform control to increase the amount of hydrogen fed to the combustion chamber the smaller the load of internal combustion engine. Alternatively, it is possible to perform control to increase the ratio of hydrogen to ammonia of the fuel fed to the combustion chamber the smaller the load of internal combustion engine. Referring to FIG. 4, in the hydrogen generator, it is possible to perform control to increase the flow ratio of air to ammonia of the gas fed to the cracker the smaller the load of internal combustion engine. By performing this control, it is possible stably burn the fuel in the combustion chamber even if the load of the internal combustion engine is small.

Further, as the operating state of the internal combustion engine, the temperature of the engine body 1 can be illustrated. For example, as the temperature of the engine body 1, it is possible to detect the temperature of the engine cooling water. In the internal combustion engine, the temperature of the engine body 1 is sometimes low. Ammonia is poor in ignitability, so when the temperature of the engine body 1 is low, it is preferable to feed fuel raised in ratio of hydrogen to ammonia to each combustion chamber 5. In the internal combustion engine in the present embodiment, when the temperature of the engine body 1 is lower than a predetermined temperature judgment value, control is performed to increase the amount of hydrogen with respect to the amount of ammonia fed to the combustion chamber 5. It is possible to perform control so that the ratio of hydrogen to the ammonia of the gas flowing out from the hydrogen generator becomes a predetermined ratio or more. It is possible to control the flow ratio of air to ammonia fed to the cracker 51a to a predetermined ratio or more. Alternatively, it is possible to perform control to increase the flow ratio of air to ammonia fed to the cracker 51a the lower the temperature of the engine body 1.

For example, when stopping the internal combustion engine for a long time, then starting it again, the engine body 1 is low in temperature. The internal combustion engine in the present embodiment, at the time of cold startup, uses the heater 63 arranged around the cracker 51a (see FIG. 1) to heat the catalyst 60a until the temperature of the catalyst 60a becomes a predetermined temperature or more. For example, when the temperature of the catalyst 60a is the activation temperature or more, the catalyst 60a is fed ammonia and air. In the present embodiment, when starting up the internal combustion engine, control is performed so that the flow ratio of air to ammonia fed to the cracker 51a becomes a predetermined ratio or more. Alternatively, it is possible to detect the temperature of the engine body 1 and to perform control so as to, as the temperature of the engine body 1 rises, gradually reduce the flow ratio of air to ammonia fed to the cracker 51a.

Referring to FIG. 4 and FIG. 5, for example, when the temperature of the engine body 1 is lower than a predetermined temperature judgment value, it is possible to make the molar ratio of the oxygen to the ammonia 0.15 or more. That is, it is possible to make the molar ratio of air to ammonia 0.7 or more. By performing this control, it is possible to make the concentration of ammonia included in the gas flowing out from the cracker about 0%. Furthermore, preferably, it is possible to make the molar ratio of the oxygen to the ammonia 0.2 or more. It is possible to make almost all of the fuel included in the gas flowing out from the cracker hydrogen. As a result, it is possible to stably burn the fuel in the combustion chamber 5.

The operating state of the internal combustion engine is not limited to the engine speed, load of internal combustion engine, temperature of the engine body, etc. Any operating state may be employed.

Referring to FIG. 10, in the internal combustion engine of the present embodiment, the hydrogen generator in Embodiment 1 is attached to the intake passage of the internal combustion engine. As explained in Embodiment 1, it is possible to control the molar ratio of the oxygen to the ammonia fed to the cracker using the temperature of the catalyst. That is, when controlling the cracker in accordance with the amount of hydrogen and the amount of ammonia required at the hydrogen generator, it is possible to detect the temperature of the catalyst 60a detected by the temperature sensor 74a of the cracker 51a and use the detected temperature of the catalyst 60a as the basis to adjust the ammonia flow and air flow fed to the cracker 51a.

Further, in the same way as Embodiment 1, when adjusting the flow of ammonia and the flow of oxygen fed to the cracker 51a, it is preferable to perform control so that the temperature of the catalyst 60a becomes within a predetermined range. As the temperature range of the catalyst 60a, for example, as the low temperature side temperature judgment value, it is possible to illustrate the temperature at which the catalyst 60a is activated. Further, as the high temperature side temperature judgment value, it is possible to illustrate the heat resistance temperature of the catalyst 60a.

Figure 13:
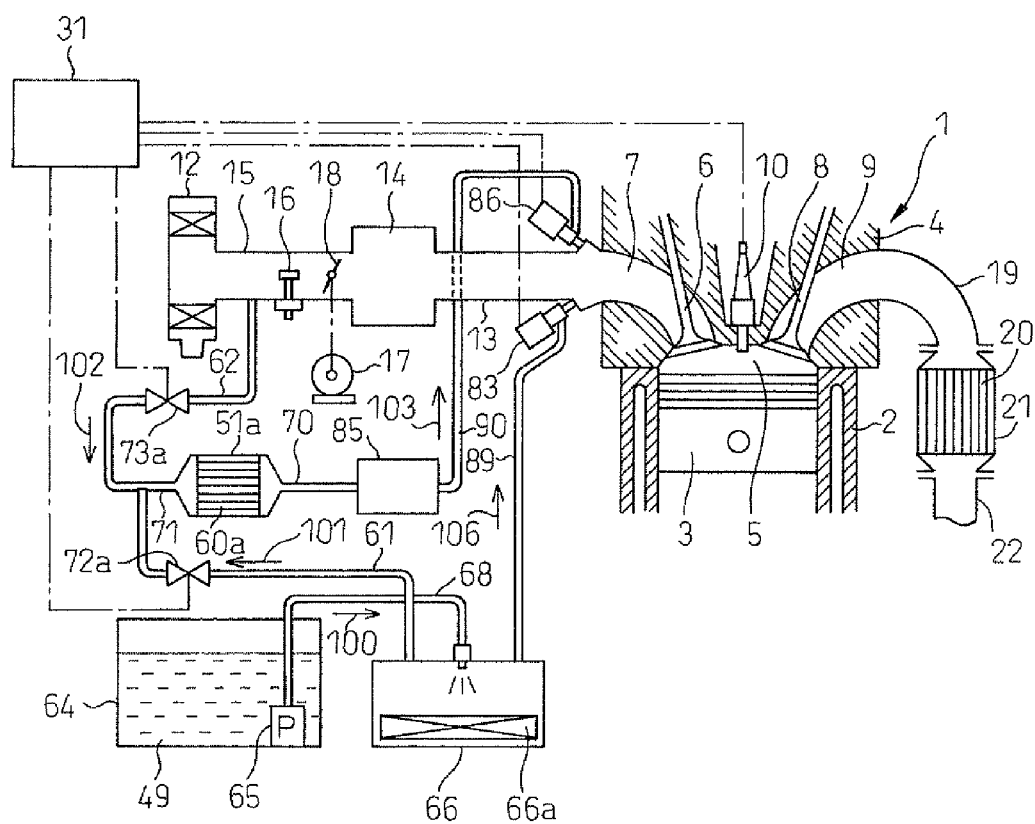
FIG. 13 is a schematic view of a second internal combustion engine of Embodiment 3.

FIG. 13 is a schematic view of the second internal combustion engine in the present embodiment. The second internal combustion engine in the present embodiment is formed so that part of the gaseous ammonia generated in the evaporator 66 is fed to the combustion chamber 5 without passing through the cracker 51a.

The second internal combustion engine in the present embodiment is provided with an ammonia injector 83 which injects the gaseous ammonia toward the engine intake passage. The ammonia injector 83 is connected through the feed pipe 89 to the evaporator 66 of the hydrogen generator. Part of the ammonia generated at the evaporator 66, as shown by the arrow 106, is fed through the feed pipe 89 to the ammonia injector 83. Part of the ammonia vaporized at the evaporator 66 is injected from the ammonia injector 83 to the inside of the intake runner 13. Referring to FIG. 11 and FIG. 13, the output port 37 of the electronic control unit 31 is connected through a corresponding drive circuit 39 to the ammonia injector 83. The ammonia injector 83 is controlled by the electronic control unit 31.

In the second internal combustion engine in the present embodiment as well, it is possible to use at least one of ammonia and hydrogen as fuel and burn the fuel in the combustion chamber 5. In the second internal combustion engine in the present embodiment, by adjusting the air flow and ammonia flow fed to the cracker 51a of the hydrogen generator, it is possible to adjust the amount of hydrogen and the amount of ammonia injected from the fuel injector 86 and fed to the combustion chamber 5. Furthermore, by controlling the ammonia injector 83, it is possible to adjust the amount of ammonia fed to the combustion chamber 5.

The amount of ammonia and the amount of hydrogen fed to the combustion chamber 5 can be determined based on an operating state of the internal combustion engine. The electronic control unit 31 uses the amount of ammonia and the amount of hydrogen fed to each combustion chamber 5 as the basis to control the hydrogen generator, fuel injector 86, and ammonia injector 83.

In the second internal combustion engine, part of the gaseous ammonia produced in the evaporator 66 is fed to the combustion chamber 5 without passing through the cracker 51a. In the operation of the internal combustion engine, sometimes the amount of hydrogen fed to the combustion chamber 5 is reduced and sometimes the amount of hydrogen is made zero. In this case, it is possible to reduce the amount of ammonia fed from the evaporator 66 to the cracker 51a and increase the amount of ammonia fed to the ammonia injector 83. For example, when making the amount of hydrogen fed to the combustion chamber 5 zero, it is possible to make the cracker 51a stop. That is, it is possible to drive the cracker 51a when hydrogen is necessary.

In the second internal combustion engine, based on the operating state of the internal combustion engine, it is possible to change the amount of ammonia fed from the evaporator 66 to the cracker 51a and the amount of ammonia fed from the evaporator 66 through the ammonia injector 83 to the combustion chamber 5.

For example, it is possible to detect the load as the operating state of the internal combustion engine and increase the ammonia flow fed from the evaporator 66 to the cracker 51a the smaller the load of internal combustion engine so as to generate more hydrogen at the hydrogen generator. It is therefore possible to feed more hydrogen to the combustion chamber. By increasing the opening degree of the flow regulator 72a feeding ammonia to the cracker 51a, it is possible to increase the flow of ammonia fed to the cracker 51a. The flow of air fed to the cracker 51a can be determined based on the amount of hydrogen and the amount of ammonia required at the hydrogen generator. Further, it is preferable to perform control so that the smaller the load of internal combustion engine, the smaller the amount of ammonia injected from the ammonia injector 83. By performing this control, it is possible to increase the ratio of the hydrogen in the fuel fed to the combustion chamber and stably burn the fuel the smaller the load of internal combustion engine.

Similar control may be performed when detecting the engine speed as the operating state of the internal combustion engine. For example, the higher the engine speed, it is possible to perform control for increasing the amount of ammonia fed from the evaporator 66 to the cracker 51a and perform control to decrease the amount of ammonia fed from the evaporator 66 through the ammonia injector 83 to the engine intake passage. It is therefore possible to increase the amount of hydrogen generated at the cracker 51a. The higher the engine speed, the more the hydrogen that can be fed to the combustion chamber.

When detecting the temperature of the engine body 1 as the operating state of the internal combustion engine, it is possible to perform control so that the lower the temperature of the engine body 1, the smaller the amount of ammonia injected from the evaporator 66 through the ammonia injector 83 to the engine intake passage and the smaller the amount of ammonia fed from the evaporator 66 to the cracker 51a. It is possible to increase the amount of hydrogen produced in the cracker 51a. The lower the temperature of the engine body, the more the hydrogen that can be fed to the combustion chamber.

Note that, when performing control to reduce the amount of ammonia fed to the combustion chamber 5, it is also possible to reduce the feed of the amount of ammonia from the ammonia injector 83 to zero. For example, at the time of cold start of the internal combustion engine or when the temperature of the engine body 1 is less than a predetermined temperature, it is possible to feed all of the ammonia vaporized at the evaporator 66 to the cracker 51a.

Figure 14:
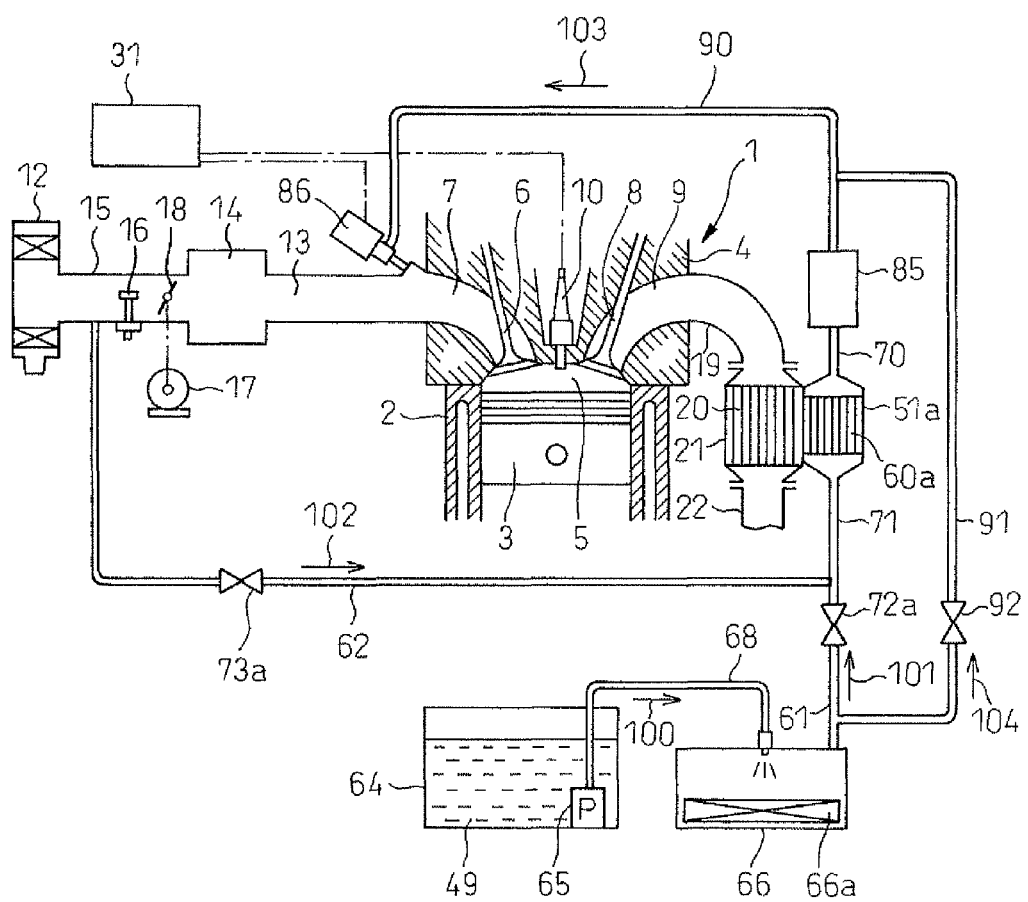
FIG. 14 is a schematic view of a third internal combustion engine of Embodiment 3.

FIG. 14 is a schematic view of a third internal combustion engine in the present embodiment. The third internal combustion engine is formed so that the hydrogen generator is provided with a cracker 51a, and the catalyst 60a of the cracker 51a performs heat exchange with the exhaust purification system. The present embodiment is formed so that the heat generated by the oxidation catalyst 20 of the catalytic converter 21 is conducted to the catalyst 60a of the cracker 51a. In the third internal combustion engine of the present embodiment, the catalytic converter 21 and the cracker 51a are arranged to contact each other.

In the third internal combustion engine of the present embodiment, due to the contact of the catalytic converter 21 and the cracker 51a, the heat generated in the oxidation catalyst 20 is conducted to the catalyst 60a, but the invention is not limited to this mode. It is also possible to conduct the heat of any device included in the exhaust purification system to the catalyst of the cracker. For example, the catalytic converter may also include a three-way catalyst. Alternatively, this may also be formed so that the exhaust gas flowing through the engine exhaust passage passes through the inside of a heat exchanger arranged inside the catalyst 60a. Alternatively, a heat exchange may be arranged between the oxidation catalyst 20 and the catalyst 60a. As the heat exchanger, one which includes, for example, first fins arranged inside the oxidation catalyst 20 and second fins arranged inside the catalyst 60a and has the first fins and second fins connected to each other by heat conductive members may be illustrated.

Further, in the third internal combustion engine of the present embodiment, in the middle of the flow path feeding ammonia to the cracker 51a, a bypass pipe 91 for bypassing the cracker 51a is connected. The bypass pipe 91 is connected to the outlet of the evaporator 66. In the middle of the bypass pipe 91, a flow regulator 92 is arranged for regulating the flow of gaseous ammonia. The flow regulator 92 is controlled by the electronic control unit 31. The bypass pipe 91 is connected to the middle of the feed pipe 90 connecting the cooler 85 and the fuel injector 86.

In the third internal combustion engine of the present embodiment, part of the ammonia vaporized at the evaporator 66, as shown by the arrow 104, can be fed through the bypass pipe 91 to the feed pipe 90. The gaseous ammonia generated at the evaporator 66 can be fed to the engine intake passage without going through the cracker 51a. Alternatively, it is possible to change the flow ratio of the compound fed to the cracker 51a to the compound fed to the combustion chambers 5 without passing through the cracker 51a. For example, by reducing the opening degree of the flow regulator 72a and increasing the opening degree of the flow regulator 92, it is possible to reduce the amount of ammonia fed to the cracker 51a and increase the amount of ammonia directly fed to the fuel injector 86.

The third internal combustion engine of the present embodiment can conduct the heat generated at the oxidation catalyst 20 of the catalytic converter 21 to the catalyst 60a of the cracker 51a so as to improve the energy efficiency. It is possible to feed heat for cracking the ammonia in the cracker 51a from the exhaust purification system. As a result, it is possible to reduce the amount of ammonia consumed for raising the temperature of the catalyst 60a.

Further, at the time of cold start of the internal combustion engine or other case where the temperature of the catalytic converter 21 is low, it is possible to have the cracker 51a oxidize the ammonia and use the heat of oxidation of the catalyst 60a to raise the temperature of the catalytic converter 21. For example, at the time of cold startup, it is possible to use the electric heater 63 to raise the temperature of the catalyst 60a to the activation temperature or more, then cause an oxidation reaction of ammonia. The heat generated at the catalyst 60a can be conducted to the oxidation catalyst 20 of the catalytic converter 21. For this reason, the oxidation catalyst 20 can be raised to the activation temperature or more in a short time. For this reason, when the catalytic converter 21 is low in temperature, it is possible to improve the properties of the exhaust gas exhausted from the exhaust purification system.

In the third internal combustion engine of the present embodiment, it is possible to perform control so that the temperature of the catalyst 60a of the cracker 51a of the hydrogen generator becomes within a predetermined temperature range. The temperature range of the catalyst 60a is preferably determined so that both the catalyst 60a and oxidation catalyst 20 become the activation temperature or more. Further, the temperature range of the catalyst 60a is preferably determined so that the catalyst 60a and oxidation catalyst 20 become less than the allowable heat resistance temperature. When the temperature of the catalyst 60a is lower than a predetermined low temperature side temperature judgment value, it is possible to perform control so as to increase the flow ratio of air to ammonia fed to the catalyst 60a. When the temperature of the catalyst 60a is higher than a predetermined high temperature side temperature judgment value, it is possible to perform control so as to decrease the flow ratio of air to ammonia fed to the catalyst 60a.

Figure 15:
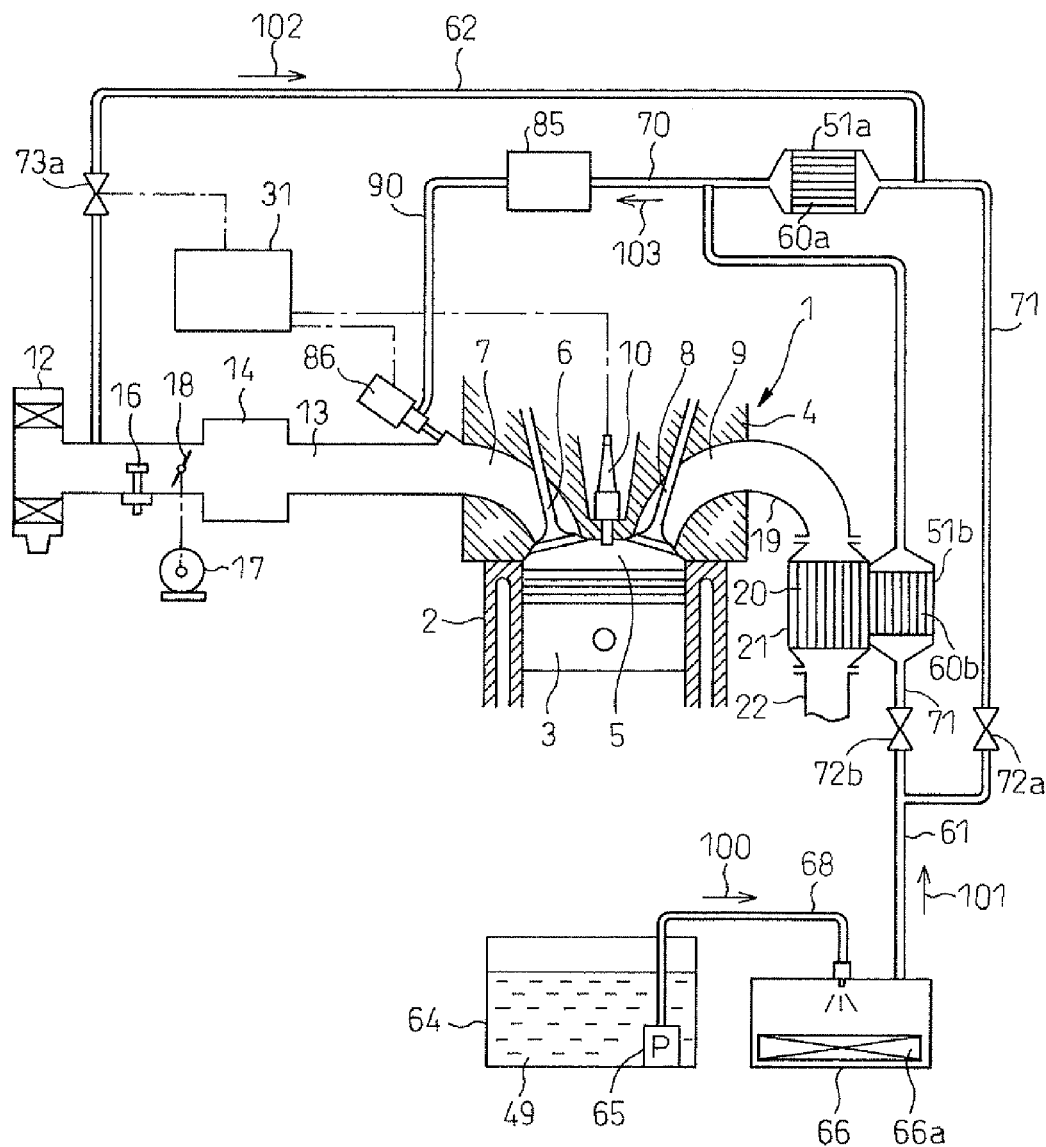
FIG. 15 is a schematic view of a fourth internal combustion engine of Embodiment 3.

FIG. 15 is a schematic view of a fourth internal combustion engine in the present embodiment. The fourth internal combustion engine in the present embodiment is provided with a cracker 51a as the first cracker and a cracker 51b as the second cracker.

The catalyst 60a of the cracker 51a includes catalyst particles which promote the cracking of ammonia and catalyst particles which promote the oxidation of ammonia. The air feed pipe 62 which feeds air to the cracker 51a is formed so as to take in air from the engine intake passage. The outlet of the cracker 51a is connected to the outflow pipe 70. The outflow pipe 70 is connected to the cooler 85. The cooler 85 is connected to the feed pipe 90. The feed pipe 90 is connected to the fuel injector 86. The catalyst 60b of the cracker 51b includes catalyst particles which promote the cracking of ammonia. The cracker 51b is formed so as to be fed gaseous ammonia through the flow regulator 72b and on the other hand so as to not be fed air. The cracker 51b is formed so as to cause a cracking reaction of ammonia without causing an oxidation reaction of the ammonia.

The catalyst 60b of the cracker 51b is formed so as to perform heat exchange with the oxidation catalyst 20 of the catalytic converter 21. In the present embodiment, the cracker 51b and the catalytic converter 21 contact each other.

In the fourth internal combustion engine of the present embodiment, at the time of startup of the internal combustion engine or other case where the temperature of the catalytic converter 21 is low, the cracker 51b is not fed with ammonia, but the cracker 51a is fed with ammonia. For example, at the time of cold startup, the electric heater 63 is used to heat the catalyst 60a to the activation temperature. After the catalyst 60a reaches the activation temperature, an oxidation reaction occurs and the ammonia can be cracked. For this reason, even when the catalytic converter 21 is low in temperature, it can crack the ammonia by the catalyst 60a.

Along with the rise of the temperature of the oxidation catalyst 20 of the catalytic converter 21, the temperature of the catalyst 60b of the cracker 51b also rises. When the temperature of the catalyst 60b becomes a predetermined temperature or more, ammonia is fed to the cracker 51b. The heat of the oxidation catalyst 20 can be conducted to the catalyst 60b of the cracker 51b and the ammonia can be cracked in the cracker 51b. For example, when the temperature of the catalyst 60b rises to the activation temperature or more, the flow regulator 72b is opened and ammonia is fed to the cracker 51b. The catalyst 60b can crack the ammonia. In this case, it is possible to perform control to reduce the flow of ammonia fed to the cracker 51a.

In the fourth internal combustion engine, the flow of ammonia fed to the first cracker and the flow of ammonia fed to the second cracker can be changed in accordance with the operating state of the internal combustion engine. For this reason, an internal combustion engine superior in energy efficiency can be provided. Further, it is possible to use the heat of the exhaust purification system to crack the ammonia, so it is possible to reduce the amount of ammonia consumed for heating the cracking catalyst.

Figure 16:
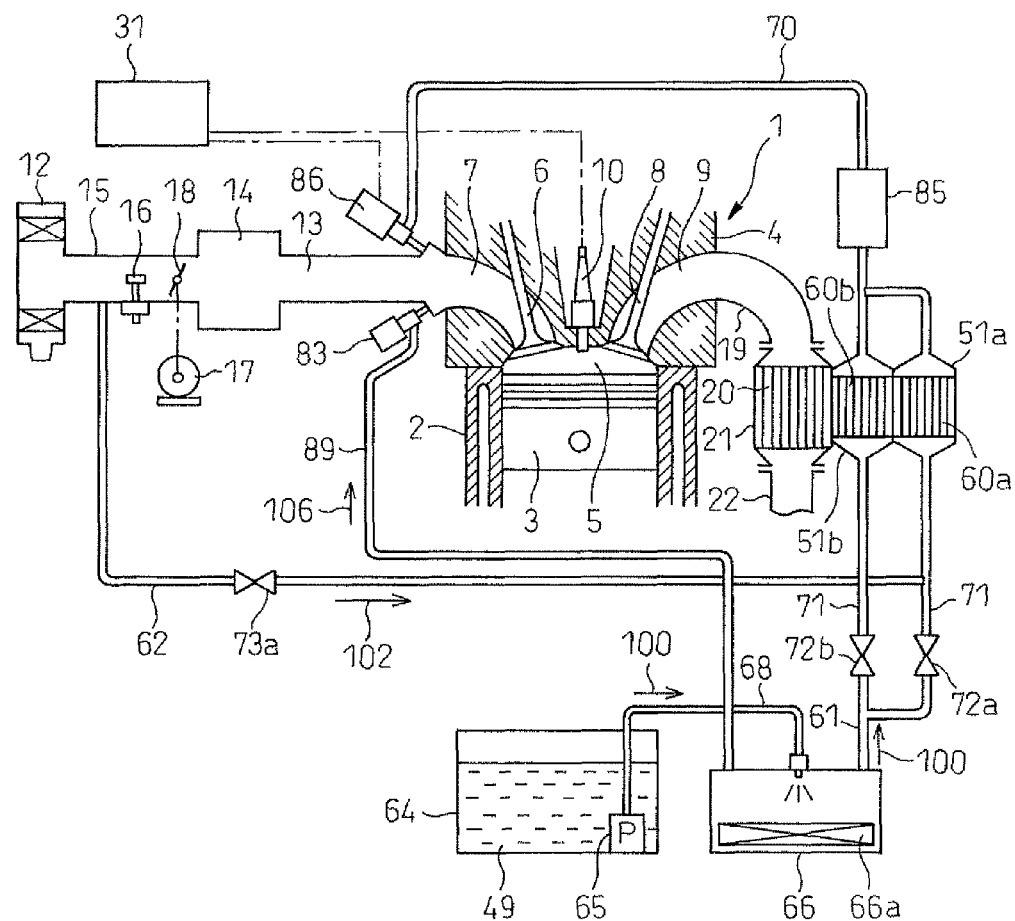
FIG. 16 is a schematic view of a fifth internal combustion engine of Embodiment 3.

FIG. 16 is a schematic view of a fifth internal combustion engine in the present embodiment. In the fifth internal combustion engine, a hydrogen generator similar to the hydrogen generator in Embodiment 2 is attached to the internal combustion engine. In the fifth internal combustion engine, a cracker 51a is provided as the first cracker and a cracker 51b is provided as the second cracker. The cracker 51a includes catalyst particles which promote the cracking of ammonia and catalyst particles which promote the oxidation of ammonia. The cracker 51b includes catalyst particles which promote the cracking of ammonia.

The catalyst 60b of the cracker 51b is formed so as to perform heat exchange with the oxidation catalyst 20 of the catalytic converter 21. In the present embodiment, the cracker 51b contacts the catalytic converter 21. Furthermore, the catalyst 60b of the cracker 51b is formed so as to perform heat exchange with the catalyst 60a of the cracker 51a. In the present embodiment, the cracker 51a and the cracker 51b are arranged so as to contact each other. The ammonia generated at the evaporator 66 is injected through the feed pipe 89 from the ammonia injector 83. The hydrogen generated at the crackers 51a, 51b is injected from the fuel injector 86. The rest of the configuration is similar to the fourth internal combustion engine in the present embodiment.

In the fifth internal combustion engine of the present embodiment, it is possible to supply not only the heat generated by the oxidation catalyst 20 of the catalytic converter 21, but also the heat generated by the catalyst 60a of the cracker 51a to the catalyst 60b of the cracker 51b not having a function of generating heat. For example, at the time of startup of the internal combustion engine etc., by causing the catalyst 60a of the cracker 51a to oxidize the ammonia, it is possible to raise the temperature of the catalyst 60b of the cracker 51b to the activation temperature or more in a short time.

In the operational control of the fifth internal combustion engine, for example, it is possible to detect the temperature of the catalyst 60b of the cracker 51b to which air is not fed. If the temperature of the catalyst 60b is less than a predetermined low temperature side temperature judgment value, it is possible to perform control to increase the ammonia flow fed to the catalyst 60a having an oxidation function on the one hand and to decrease the ammonia flow fed to the catalyst 60b not having an oxidation function. As a result, it is possible to raise the temperature of the catalyst 60b of the cracker 51b. If the temperature of the catalyst 60b becomes higher than a predetermined high temperature side temperature judgment value, it is possible to perform control to decrease the ammonia flow fed to the catalyst 60a having an oxidation function and increase the ammonia flow fed to the catalyst 60b not having an oxidation function.

The fuel injector and ammonia injector in the present embodiment are formed so as to inject fuel to the engine intake passage, but the invention is not limited to this mode. There respective injectors may also be formed so as to be able to feed fuel to each combustion chamber. For example, respective injectors may also be arranged so as to directly inject fuel to each combustion chamber.

The rest of the configuration, action, and effects are similar to Embodiment 1 or 2, so the explanation will not be repeated here.

The above examples can be suitably combined. Parts the same or equivalent to those in the above figures are assigned the same reference notations. Note that, the above examples are illustrations and do not limit the invention. Further, the examples may be changed in any way within the scope of the claims.

The invention claimed is:

1. A hydrogen generator provided with
a first cracker configured to crack a compound containing hydrogen atoms and nitrogen atoms to generate hydrogen, the first cracker includes a catalyst having catalyst particles for promoting cracking of said compound and catalyst particles for promoting oxidation of said compound;
a second cracker including a catalyst having catalyst particles which promote cracking of said compound;
a compound feeder configured to feed said compound to at least the first or second cracker, the compound feeder being configured to feed said compound to the first cracker and the second cracker, to adjust the flow of said compound fed to the first cracker, and to adjust the flow of said compound fed to the second cracker; and
an oxygen feeder configured to feed oxygen to at least the first or second cracker, wherein
the catalyst of the first cracker and the catalyst of the second cracker are formed so as to exchange heat with each other, and
the hydrogen generator feeds at least the first or second cracker with said compound and oxygen, causes said compound to oxidize to generate heat of oxidation, and uses the generated heat of oxidation to crack said compound.

2. A hydrogen generator as set forth in claim 1, wherein
the hydrogen generator is provided with a catalyst temperature detector which detects a temperature of the catalyst of the second cracker and,
when the temperature of the catalyst of the second cracker is less than a predetermined temperature, reduces the flow of said compound fed to the second cracker and increases the flow of said compound fed to the first cracker.

3. A hydrogen generator as set forth in claim 1, wherein the oxygen feeder is configured to feed oxygen to at least the first or second cracker such that a molar ratio of oxygen to said compound which the compound feeder feeds becomes 0 to 0.3.

4. A hydrogen generator as set forth in claim 1, further provided with a catalyst temperature detector which detects the temperature of the catalyst and a controller which controls at least one of the compound feeder and oxygen feeder, wherein
the compound feeder is formed so as to be able to adjust the flow of said compound fed to at least the first or second cracker,
the oxygen feeder is formed to be able to adjust the flow of oxygen fed to at least the first or second cracker, and
the controller adjusts at least one of the flow of said compound and the flow of oxygen fed to the catalyst so that the temperature of the catalyst detected by the catalyst temperature detector becomes within a predetermined range of temperature.

5. A hydrogen generator as set forth in claim 4, wherein the controller uses the catalyst temperature detector to detect the temperature of the catalyst and, when the detected temperature of the catalyst is higher than a predetermined temperature, reduces the flow ratio of the oxygen to said compound.

6. A hydrogen generator as set forth in claim 4, wherein the controller uses the catalyst temperature detector to detect the temperature of the catalyst and, when the detected temperature of the catalyst is lower than a predetermined temperature, increases the flow ratio of the oxygen to said compound.

7. A hydrogen generator as set forth in claim 1, further provided with a mixer arranged in a flow path at an upstream side from the catalyst, wherein
the mixer is formed to promote mixing of gas containing oxygen fed from the oxygen feeder and gas containing said compound fed from the compound feeder.

8. An internal combustion engine provided with
a hydrogen generator as set forth in claim 1,
an engine body including a combustion chamber in which fuel is burned and an engine intake passage connected to the combustion chamber, and
a hydrogen feeder connected to the hydrogen generator,
the oxygen feeder feeds the air inside the engine intake passage to at least the first or second cracker, and
the hydrogen feeder feeds the hydrogen produced in the hydrogen generator as fuel to the combustion chamber.

9. An internal combustion engine as set forth in claim 8, wherein
the compound feeder includes
a tank which stores the liquid compound and
an evaporator which heats the liquid compound to vaporize the liquid compound, and
at least part of the gaseous compound produced at the evaporator is fed as fuel to the combustion chamber without passing through at least the first or second cracker.

10. An internal combustion engine as set forth in claim 8, wherein
the engine body is formed so as to be cooled by cooling water
the hydrogen generator includes a cooler arranged at a downstream side of at least the first or second cracker and cooling the gas flowing out from at least the first or second cracker, and
the cooler is formed so as to cool the gas flowing out from at least the first or second cracker by the cooling water of the engine body.

11. An internal combustion engine as set forth in claim 8, further provided with a speed detection device which detects the engine speed of the internal combustion engine, wherein
the hydrogen feeder is formed so as to be able to adjust the amount of hydrogen fed to the combustion chamber, and
the engine detects the engine speed and increases the amount of hydrogen fed to the combustion chamber the higher the engine speed.

12. An internal combustion engine as set forth in claim 11, wherein
the hydrogen generator is provided with a controller which controls at least one of the compound feeder and oxygen feeder,
the compound feeder is formed so as to be able to adjust the flow of said compound fed to at least the first or second cracker,
the oxygen feeder is formed to be able to adjust the flow of oxygen fed to at least the first or second cracker, and
the controller adjusts at least one of the flow of oxygen and the flow of compound fed to at least the first or second cracker based on the amount of hydrogen fed by the hydrogen feeder to the combustion chamber.

13. An internal combustion engine as set forth in claim 8, further provided with a load detection device which detects a load of the internal combustion engine, wherein
the hydrogen feeder is formed so as to be able to adjust the amount of hydrogen fed to the combustion chamber, and
the engine detects the load of the internal combustion engine and increases the amount of hydrogen fed to the combustion chamber the smaller the load of the internal combustion engine.

14. An internal combustion engine as set forth in claim 13, wherein
the hydrogen generator is provided with a controller which controls at least one of the compound feeder and oxygen feeder,
the compound feeder is formed so as to be able to adjust the flow of said compound fed to at least the first or second cracker,
the oxygen feeder is formed to be able to adjust the flow of oxygen fed to at least the first or second cracker, and
the controller adjusts at least one of the flow of oxygen and the flow of said compound fed to at least the first or second cracker based on the amount of hydrogen fed by the hydrogen feeder to the combustion chamber.

15. An internal combustion engine as set forth in claim 8, wherein
the hydrogen generator is provided with a heater that heats the catalyst, and,
when starting up the internal combustion engine, the engine uses the heater to heat the catalyst and, when the temperature of the catalyst becomes higher than a predetermined temperature, starts the feeds of oxygen and said compound to the catalyst.

16. An internal combustion engine as set forth in claim 8, wherein
the compound feeder is formed so as to be able to adjust the flow of said compound fed to at least the first or second cracker,
the oxygen feeder is formed to be able to adjust the flow of oxygen fed to at least the first or second cracker, and
when the temperature of the catalyst is lower than a predetermined temperature, the engine increases the flow ratio of the oxygen to said compound.

17. An internal combustion engine as set forth in claim 8, further provided with an engine temperature detector which detects the temperature of the engine body, wherein
the compound feeder is formed so as to be able to adjust the flow of said compound fed to at least the first or second cracker,
the oxygen feeder is formed to be able to adjust the flow of oxygen fed to at least the first or second cracker, and
the hydrogen generator, when the temperature of the engine body is lower than a predetermined temperature, feeds said compound and oxygen to at least the first or second cracker so that a molar ratio of oxygen to said compound becomes 0.15 or more.

18. An internal combustion engine as set forth in claim 9, further provided with an operating state detection device which detects an operating state of the internal combustion engine, wherein the compound feeder is formed so as to be able to adjust the flow of said compound fed to at least the first or second cracker, the hydrogen generator changes the flow ratio of said compound fed from the evaporator to at least the first or second cracker to said compound fed from the evaporator to the combustion chamber without going through at least the first or second cracker based on the operating state of the internal combustion engine.

19. An internal combustion engine as set forth in claim 18, wherein the operating state detection device is provided with an engine temperature detector which detects the temperature of the engine body, and the engine detects the temperature of the engine body and increases the flow ratio of said compound fed to at least the first or second cracker to said compound fed to the combustion chamber without going through at least the first or second cracker to lower the temperature of the engine body.

* * * * *